US012638135B2

(12) United States Patent
Zimmer et al.

(10) Patent No.: US 12,638,135 B2
(45) Date of Patent: May 26, 2026

(54) VAPORIZOR

(71) Applicant: ALGAS-SDI INTERNATIONAL, LLC, Seattle, WA (US)

(72) Inventors: George M. Zimmer, Seattle, WA (US); Jeffrey R. Ervin, Seattle, WA (US); Djordje Nikolic, Seattle, WA (US)

(73) Assignee: ALGAS-SDI INTERNATIONAL, LLC, Seattle, WA (US)

( * ) Notice: Subject to any disclaimer, the term of this patent is extended or adjusted under 35 U.S.C. 154(b) by 1085 days.

(21) Appl. No.: 17/761,567

(22) PCT Filed: Sep. 18, 2019

(86) PCT No.: PCT/US2019/051752
§ 371 (c)(1),
(2) Date: Mar. 17, 2022

(87) PCT Pub. No.: WO2021/054950
PCT Pub. Date: Mar. 25, 2021

(65) Prior Publication Data

US 2022/0341548 A1 Oct. 27, 2022

(51) Int. Cl.

*F17C 7/04* (2006.01)
*F28D 1/02* (2006.01)
(Continued)

(52) U.S. Cl.

CPC .............. *F17C 7/04* (2013.01); *F28D 1/0246* (2013.01); *F28F 21/084* (2013.01); *H05B 1/0244* (2013.01); *F17C 2205/0323* (2013.01); *F17C 2205/0388* (2013.01); *F17C 2221/035* (2013.01); *F17C 2223/0153* (2013.01);
(Continued)

(58) Field of Classification Search

CPC ............ H05B 1/0244; H05B 2203/037; H05B 2203/02; H05B 2203/007; F28D 1/0246; F17C 7/04; F17C 2205/0382; F17C 2205/0323; F17C 2225/0123; F17C 2221/035; F17C 2260/023; F17C 2250/0631; F17C 2205/0388;
(Continued)

(56) References Cited

U.S. PATENT DOCUMENTS 4,255,646 A 3/1981 Dragoy et al.
4,645,904 A 2/1987 Moraski et al.
(Continued)

FOREIGN PATENT DOCUMENTS

DE 764226 C 6/1953
EP 2677246 A1 12/2013

*Primary Examiner* — Edward F Landrum
*Assistant Examiner* — Kuangyue Chen
(74) *Attorney, Agent, or Firm* — Seed Intellectual Property Law Group LLP

(57) ABSTRACT

A vaporizer for vaporizing a liquefied gas includes a first heat exchanger block having first and second linear conduits extending therethrough, a second heat exchanger block having first and second linear conduits extending therethrough, one or more heaters located between the first and second heat exchanger blocks, and an inlet capacity control valve. The heat exchanger blocks may be fabricated by extruding aluminum. The heaters may be independently powered. At least a portion of the inlet capacity control valve may be located within one of the conduits.

15 Claims, 20 Drawing Sheets

(51) Int. Cl.
*F28F 21/08* (2006.01)
*H05B 1/02* (2006.01)

(52) U.S. Cl.
CPC ................. *F17C 2225/0123* (2013.01); *F17C 2227/0304* (2013.01); *F17C 2250/0631* (2013.01); *F17C 2260/023* (2013.01); *H05B 2203/007* (2013.01); *H05B 2203/02* (2013.01); *H05B 2203/037* (2013.01)

(58) Field of Classification Search
CPC ........ F17C 2223/033; F17C 2223/0153; F17C 2227/0304; F17C 2205/0338; F28F 21/084
See application file for complete search history.

(56) References Cited

U.S. PATENT DOCUMENTS

| | | | | |
|---|---|---|---|---|
| 6,044,825 | A | 4/2000 | Carter et al. | |
| 6,707,987 | B2 | 3/2004 | Zimmer | |
| 6,816,669 | B2 | 11/2004 | Zimmer et al. | |
| 6,957,013 | B2 | 10/2005 | Zimmer | |
| 2002/0186966 | A1* | 12/2002 | Zimmer | F17C 13/026 392/397 |
| 2009/0260586 | A1* | 10/2009 | Geskes | F02M 26/22 165/104.19 |

* cited by examiner

VAPORIZOR

BACKGROUND

Technical Field

This disclosure relates generally to vaporizers for vaporizing liquefied gases such as liquefied petroleum gas.

Description of the Related Art

Vaporizers for the controlled vaporization of liquefied gases are generally known. One electrically heated liquefied petroleum gas (LPG) vaporizer is disclosed in U.S. Pat. No. 4,255,646. Another liquefied gas vaporizer is disclosed in U.S. Pat. No. 4,645,904. Such vaporizers may include a pressure vessel having a liquefied gas inlet near a lower end and a gas vapor outlet near a closed upper end remote from the liquefied gas inlet. A heating core may be disposed within the pressure vessel, usually positioned close to the lower end, and typically comprises an electric heating element, but can be of other types.

Various techniques are known for ensuring that a sufficient flow of liquefied gas is provided to the vaporizer without flooding the vaporizer and saturating the gas vapor at the outlet with liquefied gas. For example, a temperature sensor has been used to measure the temperature of the gas vapor in the gas vapor outlet and close a solenoid valve on the liquefied gas inlet if the outlet temperature becomes low, indicating saturation of the gas vapor. An optical sensor has also been used to sense the presence of liquid in the gas vapor to regulate the inflow of the liquefied gas to the vaporizer.

Vaporizers may also have liquefied gas sensing means communicating with the interior of the pressure vessel near its upper end, below the gas vapor outlet. The liquefied gas sensing means is typically a float switch for sensing the level of liquefied gas in the pressure vessel and controlling a valve to stop the inflow of liquefied gas to the vaporizer. The valve stops the flow of liquefied gas to the liquefied gas inlet before the liquefied gas floods through the outlet of the vaporizer.

BRIEF SUMMARY

A heater for heating a liquefied gas may be summarized as comprising: a heat exchanger block having a first end, a second end, and a conduit that extends from the first end to the second end; and a capacity control valve including: a valve body enclosing a thermal expansion chamber, a liquefied gas inlet chamber, and a liquefied gas outlet chamber; an outlet aperture that fluidically couples the liquefied gas outlet chamber to the conduit; and a temperature sensor configured to pressurize an expansion fluid within the thermal expansion chamber to a first pressure dependent upon a temperature of a fluid leaving the heater; wherein the capacity control valve is configured to allow liquefied gas to flow from the liquefied gas inlet chamber to the liquefied gas outlet chamber at a rate dependent upon a difference between the first pressure and a second pressure within the liquefied gas inlet chamber; and wherein at least a portion of the capacity control valve is located within the conduit and inside the heat exchanger block.

The capacity control valve may be threaded into the conduit of the heat exchanger block. The outlet aperture may fluidically couple the liquefied gas outlet chamber directly to the conduit. There may be no conduit between the outlet aperture of the capacity control valve and the conduit of the heat exchanger block. The outlet aperture of the capacity control valve may be located within the conduit and inside the heat exchanger block. At least a portion of the liquefied gas inlet chamber of the capacity control valve may be located within the conduit and inside the heat exchanger block. The liquefied gas outlet chamber of the capacity control valve may be located within the conduit and inside the heat exchanger block. The capacity control valve may include an inlet aperture that fluidically couples the liquefied gas inlet chamber to the conduit. The inlet aperture of the capacity control valve may be located within the conduit and inside the heat exchanger block. The heater may include an open annular space between a portion of the capacity control valve that includes the inlet aperture and a surface of the conduit that surrounds the portion of the capacity control valve that includes the inlet aperture.

The capacity control valve may be a spring-loaded ball valve including a spring and a ball, and the spring and the ball may be located within the conduit and inside the heat exchanger block. The capacity control valve may include a drain aperture and the drain aperture may be located within the conduit and inside the heat exchanger block. The capacity control valve may include an integral relief bypass valve inside the valve body. The integral relief bypass valve may have a first opening in fluid communication with the liquefied gas inlet chamber and a second opening in fluid communication with the liquefied gas outlet chamber. The integral relief bypass valve may include a spring-loaded ball valve inside the valve body. The heater may be a vaporizer.

A heater for heating a liquefied gas may be summarized as comprising: a heat exchanger block having a first end, a second end, and a conduit that extends from the first end to the second end, wherein the conduit extends linearly along a single axis along an entire length of the heat exchanger block from the first end of the heat exchanger block to the second end of the heat exchanger block; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration.

The conduit may be a first conduit, the single axis may be a first single axis, and the heat exchanger block may have a second conduit that extends from the first end of the heat exchanger block to the second end of the heat exchanger block, wherein the second conduit extends linearly along a second single axis along the entire length of the heat exchanger block from the first end of the heat exchanger block to the second end of the heat exchanger block. The first single axis may be parallel to the second single axis. The heat exchanger block may include a crossover that fluidically couples the first conduit to the second conduit. The conduit may be threaded at either the first or the second end of the heat exchanger block. The conduit may be plugged at either the first or the second end of the heat exchanger block. The heat exchanger block may consist of a single monolithic, integral piece of material. The heater may be a vaporizer.

A method may be summarized as comprising: fabricating a heater for heating a liquefied gas, the heater comprising: a heat exchanger block having a first end, a second end, and a conduit that extends from the first end to the second end; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration; wherein fabricating the heater includes extruding the heat exchanger block as a single piece of aluminum.

The heat exchanger block may be a first heat exchanger block and the heater may further comprise a second heat exchanger block having a first end, a second end, and a conduit that extends from the first end to the second end; the positive temperature coefficient heater may be located between the first heat exchanger block and the second heat exchanger block; and fabricating the heater may include extruding the second heat exchanger block as a single piece of aluminum. Fabricating the heater may include extruding the first heat exchanger block through an extruder die and extruding the second heat exchanger block through the extruder die. Fabricating the heater may include extruding a single extrusion of aluminum and cutting the single extrusion of aluminum along a plane perpendicular to an axis of the extrusion to separate the first heat exchanger block from the second heat exchanger block.

The heater may be a first heater and the method may further comprise: fabricating a second heater for heating a liquefied gas, the second heater having a greater capacity to heat liquefied gas than the first heater, the second heater comprising: a heat exchanger block having a first end, a second end, and a conduit that extends from the first end to the second end; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration; wherein fabricating the second heater includes extruding the heat exchanger block as a single piece of aluminum; wherein extruding the heat exchanger block of the first heater and extruding the heat exchanger block of the second heater includes extruding the heat exchanger blocks of the first and second heaters through the same extruder die.

The second heater may have two or three times the capacity to heat liquefied gas than the first heater. The heat exchanger block of the second heater may be about twice or three times as long as the heat exchanger block of the first heater. The first heater may have at least twice or three times as many positive temperature coefficient heaters as the second heater. Extruding the heat exchanger block as a single piece of aluminum may include extruding the heat exchanger block to have first and second undercut grooves in an outer surface thereof.

The heater may be a first heater and the method may further comprise: fabricating a second heater for heating a liquefied gas, the second heater comprising: a heat exchanger block having a first end, a second end, and a conduit that extends from the first end to the second end; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration; wherein fabricating the second heater includes extruding the heat exchanger block of the second heater as a single piece of aluminum and to have first and second undercut grooves in an outer surface thereof.

The method may further comprise coupling the heat exchanger block of the first heater to the heat exchanger block of the second heater by engaging a key with the first and second undercut grooves of the heat exchanger block of the first heater and with the first and second undercut grooves of the heat exchanger block of the second heater. The heater may be a vaporizer.

A heater for heating a liquefied gas may be summarized as comprising: a heat exchanger block having a first end, a second end, and a conduit that extends from the first end to the second end; and a plurality of independently-powered positive temperature coefficient heaters configured to heat the heat exchanger block, wherein each positive temperature coefficient heater includes first and second conductive plates and a plurality of positive temperature coefficient heating stones in electrical contact with the conductive plates in an electrically parallel configuration.

The plurality of independently-powered positive temperature coefficient heaters may include three independently-powered positive temperature coefficient heaters, wherein the three independently-powered positive temperature coefficient heaters are powered by a source of three-phase power. The source of three-phase power may supply power at up to 480 volts. The heater may be configured for use in hazardous locations. The heater may be explosion-proof. The heater may be a vaporizer.

DETAILED DESCRIPTION

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with the technology have not been shown or described in detail to avoid unnecessarily obscuring descriptions of the embodiments.

Various examples of suitable dimensions of components and other numerical values may be provided herein. Such dimensions and other numerical values may be accurate to within standard manufacturing tolerances unless stated otherwise. Such dimensions and any other specific numerical values provided herein may also be approximations wherein the actual numerical values vary by up to 1, 2, 5, 10, 15, or more percent from the stated, approximate dimensions or other numerical values.

Figure 1:
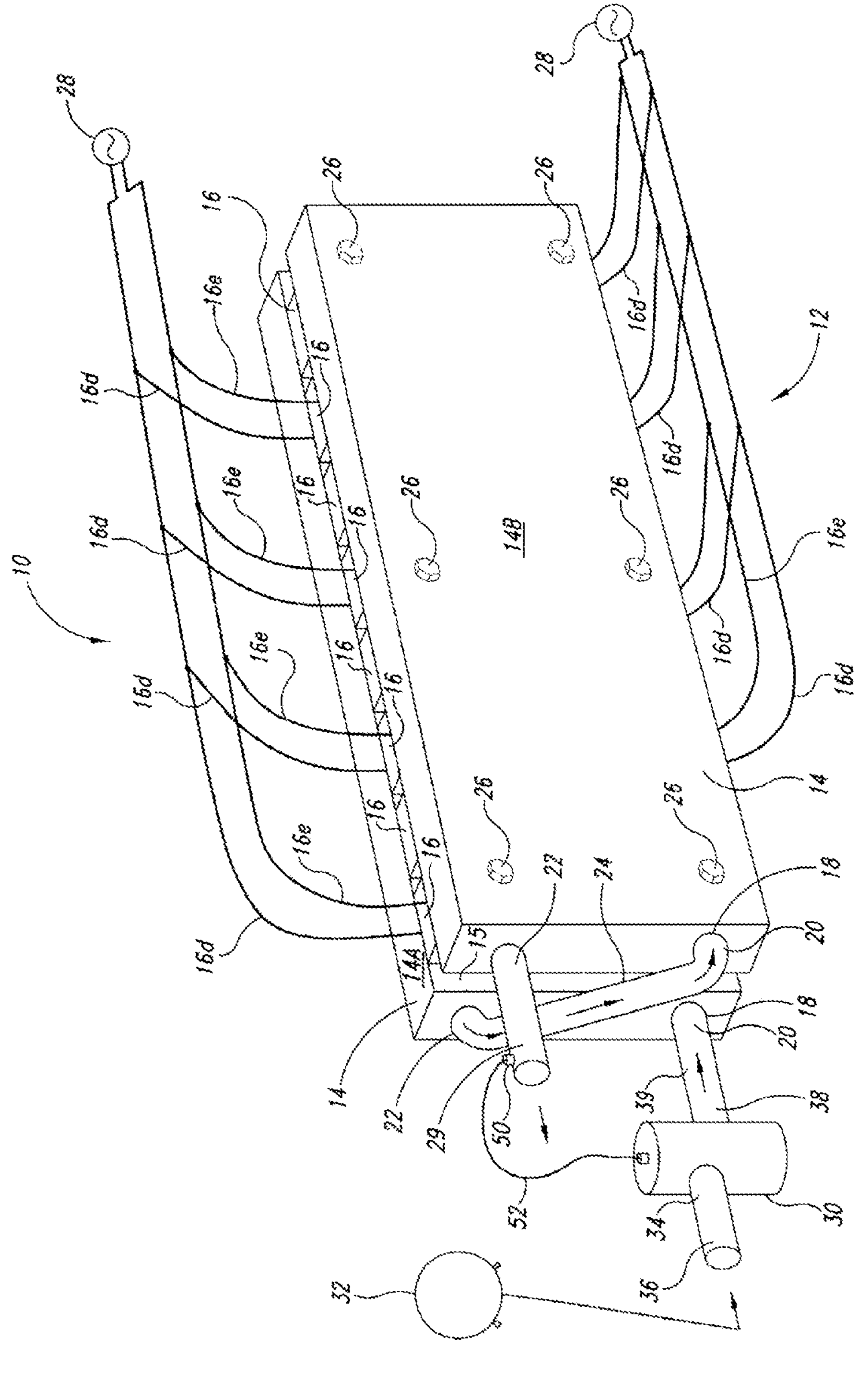
FIG. 1 illustrates a vaporizer having a heat exchanger comprised of two stacked heat exchanger blocks and a capacity control valve.
Figure 2:
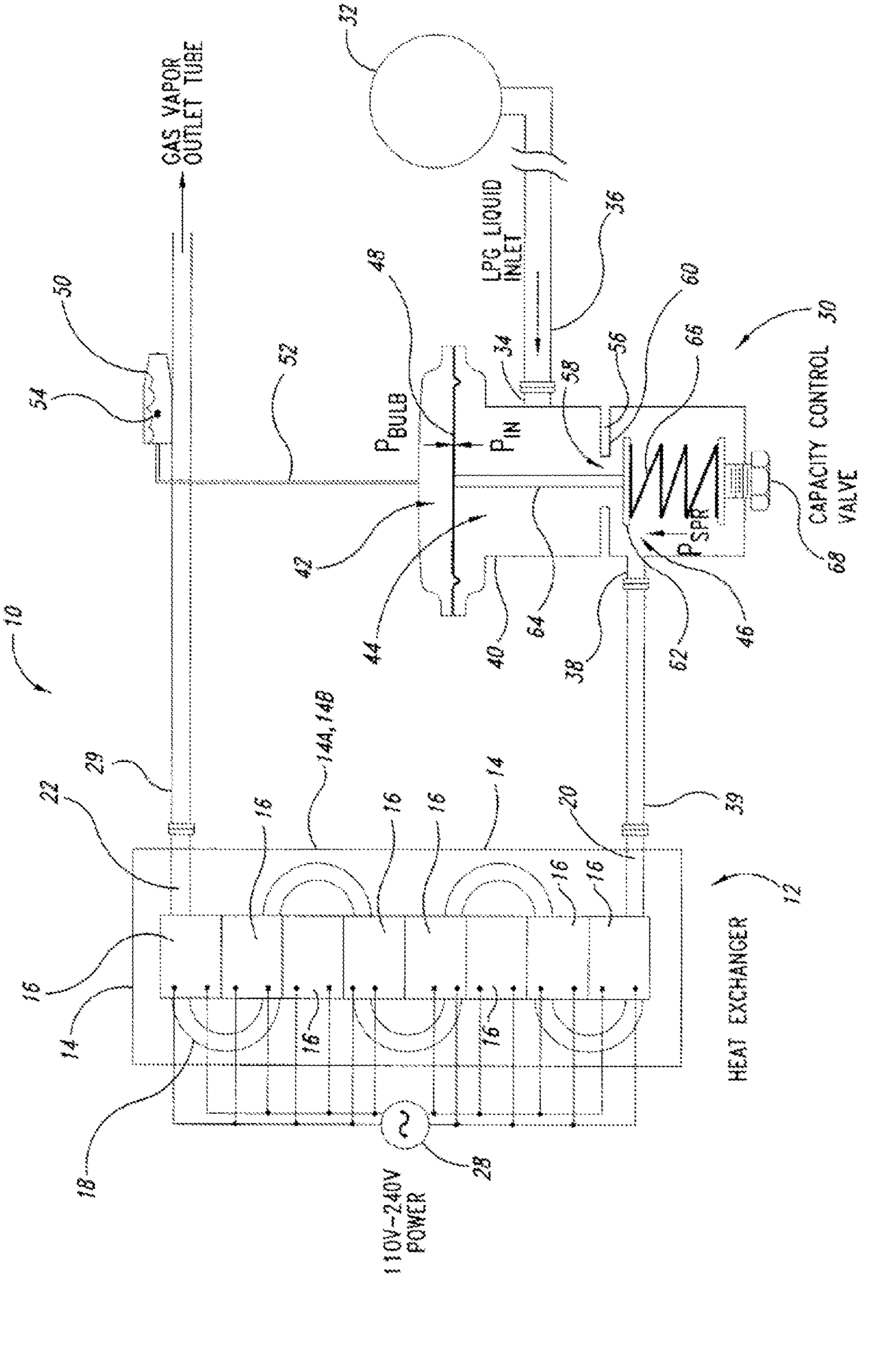
FIG. 2 illustrates a schematic diagram of the vaporizer of FIG. 1 showing the capacity control valve used to control the inflow of liquefied gas to the heat exchanger in greater detail.

An embodiment of a liquefied gas vaporizer 10 is illustrated in FIGS. 1 and 2, and includes a heat exchanger 12 which may be of a variety of constructions. A liquefied gas inlet tube 39 is connected to an inlet 20 of the heat exchanger 12 to supply liquefied gas thereto for vaporization. In the illustrated embodiment, the liquefied gas is liquefied petroleum gas (LPG). The vaporized gas exists the heat exchanger 12 from an outlet 22 connected to a gas vapor outlet tube 29. Although any conventional heat exchanger may be used, such as those illustrated in the above-identified U.S. Pat. Nos. 4,645,904 and 4,255,646, the illustrated heat exchanger 12 includes an integral vaporization tube 18 encased in an aluminum block 14. The vaporization tube 18 extends between the inlet 20 and outlet 22 of the heat exchanger 12, with the outlet positioned above the inlet. More than one vaporization tube 18 may be used.

The heat exchanger 12 includes an electric heater 16 positioned adjacent to the aluminum block 14 within which the vaporization tube 18 resides to supply heat to the vaporization tube and to thereby boil the liquefied gas entering the vaporization tube from the inlet 20 to a vapor state. The gas vapor rises within the vaporization tube 18 and exits the heat exchanger 12 via the outlet 22 and is carried away by the outlet tube 29. In one embodiment, the electric heater 16 comprises a plurality of positive temperature coefficient (PTC) heating elements placed flat against at least one face of the block 14, and in an embodiment utilizing two blocks, such as blocks 14A and 14B shown in FIGS. 1 and 6, the PTC heating elements are sandwiched securely between the two blocks. The PTC heating elements are each connected in parallel with an electrical power supply 28. The power supply 28 supplies electrical power at 110 to 240 or up to 480 volts to each of the PTC heating elements of the electric heater 16. Although an electric heater is illustrated, other heat sources may be used to supply the heat necessary for vaporization of the liquefied gas, such as steam or byproduct heated exhaust gases. While a liquefied petroleum gas vaporizer is described herein, the vaporizer 10 may be used for vaporizing other liquefied gases, such as ammonia.

The vaporizer 10 includes a capacity control valve 30 coupled between a liquefied gas source 32, such as a liquefied petroleum gas storage tank, and the heat exchanger 12. The capacity control valve 30 includes a valve inlet 34 connected to a liquefied gas inlet tube 36, which is coupled to and receives liquefied gas from the liquefied gas source 32. The capacity control valve 30 further includes a valve outlet 38 connected to the liquefied gas inlet tube 39, which extends to the inlet 20 of the heat exchanger 12. The capacity control valve 30 is constructed generally the same as a thermal expansion valve (TEX), such as commonly used in air conditioning systems. However, the capacity control valve 30 is operated in reverse of the operation of a thermal expansion valve in an air conditioning system to perform a different function, as will be described below.

The capacity control valve 30 includes a valve body 40 having a thermal expansion chamber 42, a liquefied gas inlet chamber 44 and a liquefied gas outlet chamber 46. A diaphragm 48 divides the thermal expansion chamber 42 from the liquefied gas inlet chamber 44. In the illustrated embodiment, the diaphragm is a flexible, thin metal disk of conventional design. A thermal sensing bulb 50 is positioned in thermal contact with the gas vapor outlet tube 29, which carries the vaporized gas from the heat exchanger, at a location reasonably close to the heat exchanger outlet 22. The thermal sensing bulb 50 is connected by a tube 52 to the thermal expansion chamber 42. When the vaporizer 10 is implemented for use with liquefied petroleum gas as being described herein, the sensing bulb 50 is charged with an expansion fluid 54 having saturation properties similar to those of liquefied petroleum gas. The tube 52 provides fluid communication of the fluid 54 between the sensing bulb 50 and the thermal expansion chamber 42. The sensing bulb 50 in an alternative embodiment may be replaced with a coiled tube or a pass-through tube bulb.

The diaphragm 48 is configured to respond to a pressure differential between the thermal expansion chamber 42 and the liquefied gas inlet chamber 44. At equilibrium, when the pressure in both chambers 42 and 44 is equal, the diaphragm 48 is balanced in an "at rest" position between the chambers 42 and 44. A pressure difference between the thermal expansion chamber 42 and the liquefied gas inlet chamber 44 causes the diaphragm 48 to move or flex into the one of the chambers 42 and 44 having the lesser pressure therein. The degree of expansion, i.e., the distance that the diaphragm 48 moves into the lower pressure chamber, is a function of the difference in pressure between the chambers 42 and 44: the greater the pressure differential, the farther the diaphragm 48 moves. Thus, the diaphragm 48 moves along a continuum that is infinitely variable in response to changes in the pressure differential between the thermal expansion chamber 42 and the liquefied gas inlet chamber 44.

The valve inlet 34 of the capacity control valve 30 supplies the liquefied gas carried by the liquefied gas inlet tube 36 to the liquefied gas inlet chamber 44. The valve outlet 38 discharges the liquefied gas in the liquefied gas outlet chamber 46 to the liquefied gas inlet tube 39 to supply the liquefied gas to the heat exchanger 12 for vaporization. An annular wall 56 with a central orifice 58 divides the liquefied gas inlet chamber 44 from the liquefied gas outlet chamber 46. A valve seat 60 is formed on an underside of the annular wall 56, about the orifice 58, and a valve 62 is positioned below the annular wall and is operatively movable between a fully closed position with the valve seating in the valve seat, and a fully open position with the valve moved downward, substantially away from the valve seat. The valve 62 is positionable at all positions between the fully closed and fully open positions, as will be described in greater detail below.

When the valve 62 is in the fully closed position, in seated arrangement with the valve seat 60, the valve blocks the flow of liquefied gas from the liquefied gas inlet chamber 44 into the liquefied gas outlet chamber 46, and hence blocks the flow of liquefied gas to the heat exchanger 12. As the valve 62 opens and moves downward progressively farther away from the valve seat 60, the flow of liquefied gas from the liquefied gas inlet chamber 44 into the liquefied gas outlet chamber 46 progressively increases, as does the flow of liquefied gas to the heat exchanger 12. As the open valve 62 moves upward progressively closer to the valve seat 60, the flow of liquefied gas from the liquefied gas inlet chamber 44 into the liquefied gas outlet chamber 46 progressively decreases, as does the flow of liquefied gas to the heat exchanger 12.

The movement of the valve 62 is principally controlled by the movement of the diaphragm 48 using a rigid valve stem 64, which couples the valve 62 to the diaphragm 48 for movement therewith. An upper end of the valve stem 64 is attached to a central portion of the diaphragm 48, and a lower end of the valve stem is attached to a central portion the valve 62. When a pressure differential exists between the thermal expansion chamber 42 and the liquefied gas inlet chamber 44, the diaphragm 48 moves toward the chamber with the lesser pressure therein, and the valve stem 64 causes the valve 62 to move in the same direction and by the same amount relative to the valve seat 60.

In operation, the movements of the diaphragm 48 open and close the valve 62 as the relative pressures of the liquefied gas in the liquefied gas inlet chamber 44 and the liquid 54 in the thermal expansion chamber 42 change. If the pressure $P_{BULB}$ of the liquid 54 in the thermal expansion chamber 42 should decrease, as a result of the sensing bulb 50 sensing the temperature of the gas vapor in the gas vapor outlet tube 29 decreasing, the diaphragm 48 will move upward into the thermal expansion chamber 42 and the valve stem 64 will drive the valve 62 upward. With sufficient upward movement the valve 62 will reach the fully closed position, with the valve seated in the valve seat 60 and the flow of liquefied gas to the heat exchanger 12 completely blocked. Of course, the direction and amount of movement of the valve 62 results from the amount and direction of the differential pressure experienced by the diaphragm 48. If the pressure $P_{IN}$ of the liquefied gas in the liquefied gas inlet chamber 44 should also increase or decrease, the valve 62 will move upward in a different amount, and could even move in the downward direction.

If the pressure $P_{BULB}$ of the liquid 54 in the thermal expansion chamber 42 should increase, as a result of the sensing bulb 50 sensing the temperature of the gas vapor in the gas vapor outlet tube 29 increasing, the diaphragm 48 will move downward into the liquefied gas inlet chamber 44 and the valve stem 64 will drive the valve 62 downward. With sufficient downward movement the valve 62 will reach the fully open position, with the valve spaced far from the valve seat 60 and the flow of liquefied gas to the heat exchanger 12 substantially uninhibited. The more the movement opens the valve 62, the larger the flow of liquefied gas to the heat exchanger. If the pressure $P_{IN}$ of the liquefied gas in the liquefied gas inlet chamber 44 should also increase or decrease, the valve 62 will move downward in a different amount. Again, the direction and amount of movement of the valve 62 results from the amount and direction of the differential pressure experienced by the diaphragm 48, the differential pressure being the difference between the pressure of the liquid 54 in the thermal expansion chamber 42 (which is dependent on the temperature of the gas vapor in the gas vapor outlet tube 29 being measured by the sensing bulb 50) and the pressure of the liquefied gas in the liquefied gas inlet chamber 44 (which is dependent on the pressure of the liquefied gas being supplied to the vaporizer 10 by the liquefied gas source 32).

The pressure of the liquefied gas in the liquefied gas inlet chamber 44 is the inlet pressure of the liquefied gas supplied to the vaporizer 10 by the liquefied gas source 32. This vaporizer inlet pressure changes with the conditions experienced by the liquefied gas source 32, such as the temperature of the source, and the vaporizer inlet pressure tends to follow the saturation pressure of the input gas. Thus, the capacity control valve 30 controls the input flow of liquefied gas to the heat exchanger 12 based upon both the temperature of the gas vapor in the gas vapor outlet tube 29 and the inlet pressure of the liquefied gas supplied to the vaporizer 10 by the liquefied gas source 32.

As noted above, the amount and direction of the movement of the diaphragm 48, and hence the amount and direction of movement of the valve 62 and the amount of liquefied gas that the valve allows to flow through the capacity control valve 30 into the inlet tube 39 of the heat exchanger 12, are a function of the pressure differential between the thermal expansion chamber 42 and the liquefied gas inlet chamber 44. Accordingly, a pressure within the liquefied gas inlet chamber 44 that is greater than the pressure in the thermal expansion chamber 42 will cause the diaphragm 48 to move upward and the valve stem 64 to move the valve 62 toward the valve seat 60 and the fully closed position, thereby progressively reducing the flow of liquefied gas to the heat exchanger 12. Conversely, a pressure within the thermal expansion chamber 42 that is greater than the pressure of the liquefied gas inlet chamber 44 will cause the diaphragm 48 to move downward and the valve stem 64 to move the valve 62 away from the valve seat 60 and toward the fully open position, thereby progressively increasing the flow of liquefied gas to the heat exchanger 12. Preferably, the valve 62, the valve seat 60, and the valve stem 64 are configured in combination with the diaphragm 48 such that when at equilibrium, with the pressure across the diaphragm balanced and the diaphragm 48 in the "at rest" position, the valve 62 is at a distance away from the valve seat 60 such that the pressurized flow of liquefied gas passing through the capacity control valve 30 and into the heat exchanger 12 is at a predetermined flow rate selected to provide the desired rated output of gas vapor in the outlet tube 29 at a desired superheated temperature under normal operation of the vaporizer 10.

As discussed, the pressure differential across the diaphragm 48 is the difference between the inlet liquefied gas pressure $P_{IN}$ within the liquefied gas inlet chamber 44 and the pressure $P_{BULB}$ of the liquid 54 in the thermal expansion chamber 42. Change in the temperature of the gas vapor exiting the heat exchanger 12 through the outlet tube 29 is indicative of a change in the operating condition occurring inside the heat exchanger 12, with the liquid 54 within the sensing bulb 50 communicating that change of gas vapor temperature to the thermal expansion chamber 42. As noted above, the sensing bulb 50 is charged with a fluid having saturation properties similar to those of the liquefied gas for which the vaporizer 10 is implemented, such as liquid petroleum gas for the embodiment described herein. Similarly, a change in the condition experienced by the liquefied gas source 32 is communicated to the liquefied gas inlet chamber 44 via the valve inlet 34. In operation, the net result of these changes is movement of the diaphragm 48 and hence adjustment by the capacity control valve 30 of the liquefied gas supplied to the heat exchanger 12.

For example, assuming that the diaphragm 48 was in the "at rest" position and the valve 62 was in a correspondingly open position, if a condition occurs such that the temperature of the vaporized gas in the outlet tube 29 goes down, the liquid 54 in the sensing bulb 50 contracts and the pressure in the thermal expansion chamber 42 decreases. This might result because the heat exchanger 12 is receiving a larger flow of liquefied gas than the electric heater 16 can vaporize with the desired gas vapor temperature. Assuming that there is no change also occurring in the condition of the liquefied gas source 32, this will cause the valve 62 to move upward and reduce the flow of liquefied gas to the heat exchanger 12. As the flow of liquefied gas to the heat exchanger 12 decreases, the heat produced by the electric heater 16 will be transferred to the now smaller flow of liquefied gas into the vaporization tube 18. As a result, the temperature of the vaporized gas exiting the outlet 22 will begin to increase compared to the temperature of the vaporized gas the electric heater had been producing at the higher flow rate. As the temperature of the gas vapor in the outlet tube 29 sensed by the sensing bulb 50 rises, the liquid 54 will begin to expand and the pressure in the thermal expansion chamber 42 will increase. This will cause the valve 62 to move downward and further open the valve 62 to increase the flow of liquefied gas to the heat exchanger 12 until the flow rate through the vaporization tube 18 allows the electric heater 12 to produce gas vapor in the outlet tube 29 at the desired temperature.

This operation also ensures that only gas vapor, and not liquefied gas flows out the outlet tube 29. Should the heat exchanger 12 start flooding with liquefied gas, the gas vapor being produced will become very saturated and its temperature will drop, thus moving the valve 62 toward the fully closed position and restricting or even cutting off the flow to and from the heat exchanger 12 until the temperature of the gas vapor in the outlet tube rises to the desired temperature. However, since the diaphragm 48 is responsive to the pressure $P_{IN}$ of the liquefied gas in the liquefied gas inlet chamber 44 (i.e., the inlet pressure of the liquefied gas supplied to the vaporizer 10 by the liquefied gas source 32), and not just the temperature of the gas vapor in the outlet tube 29, should a change in the inlet pressure be occurring at the same time, the operation of the capacity control valve 30 takes that into account. For example, if the inlet pressure is rising, the valve 12 will be closed even further, but if the inlet pressure is falling, the valve will not be closed as far, thereby producing overall better results than if only the temperature of the gas vapor in the outlet tube 29 was used to control the operation of the capacity control valve. Thus, the flow of liquefied gas into the heat exchanger 12 will be more accurately controlled to provide gas vapor at the desired temperature and the flow of liquefied gas into the heat exchanger 12 will not exceed the vaporization ability of the electric heater 16.

In contrast to the flooding condition just discussed, should gas vapor in the outlet tube 29 increase in the temperature beyond the desired superheated temperature, the liquid 54 in the sensing bulb 50 will expand and the pressure in the thermal expansion chamber 42 increase. This might result because the heat exchanger 12 is receiving a smaller flow of liquefied gas than the electric heater 16 can vaporize with the desired gas vapor temperature, thus overheating the gas that is vaporized. Assuming that there is no change also occurring in the condition of the liquefied gas source 32, this will cause the valve 62 to move downward and increase the flow of liquefied gas to the heat exchanger 12. As the flow of liquefied gas to the heat exchanger 12 increases, the heat produced by the electric heater 16 will be transferred to the now larger flow of liquefied gas into the vaporization tube 18. As a result, the temperature of the vaporized gas exiting the outlet 22 will begin to decrease compared to the excessive temperature of the vaporized gas the electric heater had been producing at the lower flow rate. As the temperature of the gas vapor in the outlet tube 29 sensed by the sensing bulb 50 lowers, the liquid 54 will begin to contract and the pressure in the thermal expansion chamber 42 will decrease. This will cause the valve 62 to move upward and further close the valve 62 to decrease the flow of liquefied gas to the heat exchanger 12 until the flow rate through the vaporization tube 18 allows the electric heater 12 to produce gas vapor in the outlet tube 29 at the desired temperature. As a result, the vaporizer 10 is self-regulating to always produce gas vapor at its maximum design capacity and at the desired temperature.

Again, since the diaphragm 48 is responsive to the pressure $P_{IN}$ of the liquefied gas in the liquefied gas inlet chamber 44 (i.e., the inlet pressure of the liquefied gas supplied to the vaporizer 10 by the liquefied gas source 32), and not just the temperature of the gas vapor in the outlet tube 29, should a change in the inlet pressure be occurring at the same time, the operation of the capacity control valve 30 takes that into account. For example, if the inlet pressure is falling, the valve 12 will be opened even further, but if the inlet pressure is rising, the valve will not be opened as far, thereby producing overall better results than if only the temperature of the gas vapor in the outlet tube 29 was used to control the operation of the capacity control valve. Thus, the flow of liquefied gas into the heat exchanger 12 will be more accurately controlled to provide gas vapor at the desired temperature.

The capacity control valve 30 includes a biasing spring 66 positioned between the valve 62 and an adjustment screw 68, to apply an upward biasing force or spring pressure $P_{SPR}$ on the valve tending to urge the valve toward the fully closed position. The biasing spring 66 is arranged directly below the valve 62, in coaxial alignment with the valve stem 64, and provides a resistance force against downward movement of the valve which must be overcome by the pressure $P_{BULB}$ of the liquid 54 in the thermal expansion chamber 42, in addition to the pressure $P_{IN}$ within the liquefied gas inlet chamber 44, to move the valve downward toward the fully open position. If the pressure $P_{BULB}$ of the liquid 54 in the thermal expansion chamber 42 minus the sum of the pressure $P_{IN}$ within the liquefied gas inlet chamber 44 and the spring pressure $P_{SPR}$ is greater than zero, then the valve 62 will open (i.e., if: $P_{BULB}-[P_{IN}+P_{SPR}]>0$, then the valve will open).

The adjustment screw 68 is located to engage and selectively adjustably move upward or downward the lower end of the biasing spring 66. This is accomplished by rotating the adjustment screw to threadably move it inward or outward to increase or decrease, respectively, the amount of upward force the biasing spring 66 applies to the valve, which sets the "at rest" position of the diaphragm 48, i.e., the position the diaphragm will assume if the pressure in both the chambers 42 and 44 is equal. The effect is to set the superheated temperature to which the heat exchanger 12 will heat the gas vapor in the outlet tube 29 under normal operation of the vaporizer 10. The capacity control valve 30 thus prevents liquefied gas (in the illustrated embodiment LPG liquid) carryover into outlet tube 29 by ensuring a minimum amount of superheat within the heat exchanger 12. If desired, in an alternative embodiment, the adjustment screw 68 can be deleted to provide a fixed superheat setting for the capacity control valve.

The liquefied gas vaporizer 10 includes a heat exchanger 12 comprised of two heat exchanger blocks 14 mounted face-to-face with eight positive temperature coefficient (PTC) heating elements 16 sandwiched between the heat exchanger blocks. In practice, ten PTC heating elements are used. One of the heat exchanger blocks is designated the first heat exchanger block and identified by reference numeral 14A, and the other of the heat exchanger blocks is designated the second heat exchanger block and identified by reference numeral 14B.

Figure 3:
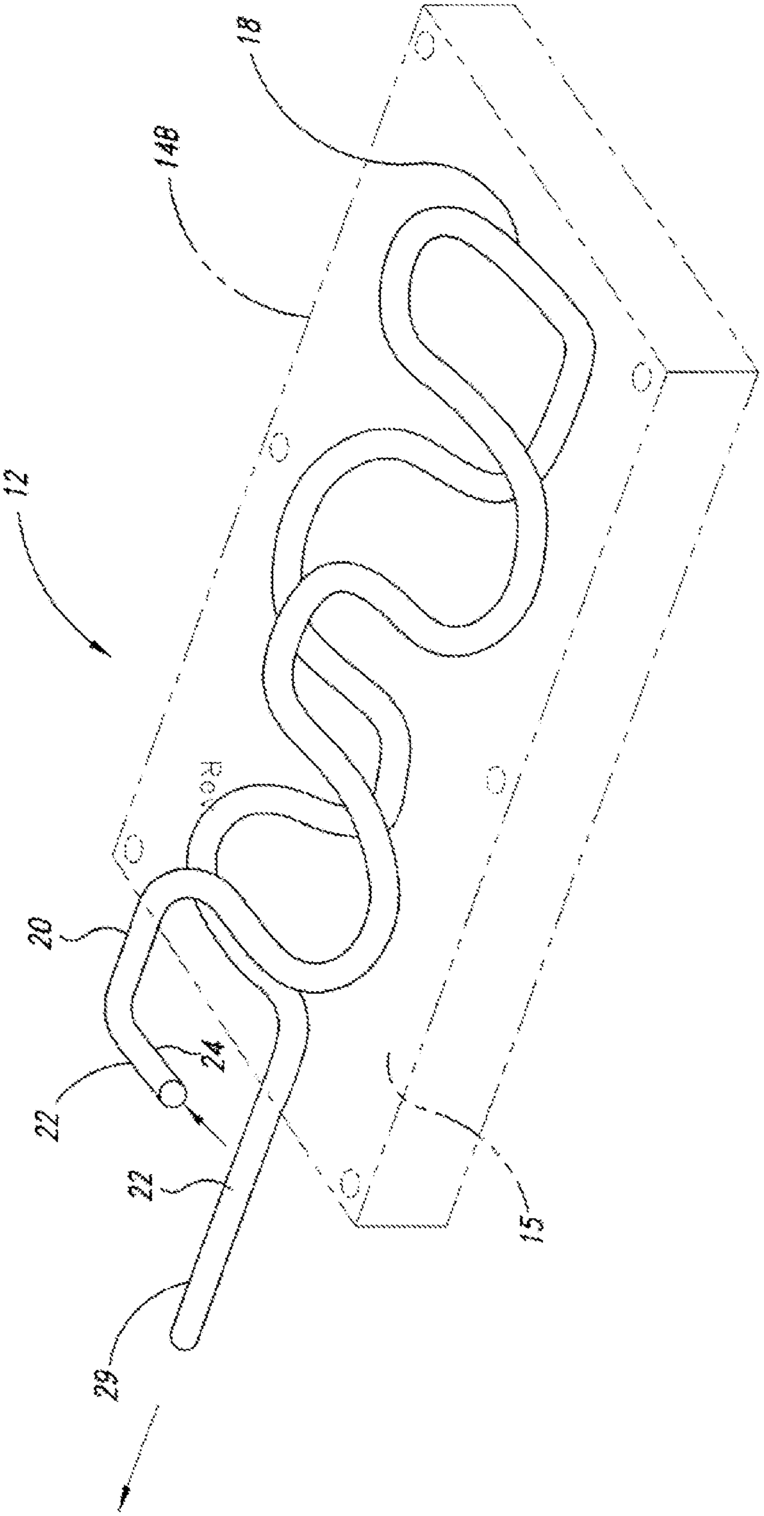
FIG. 3 illustrates a vaporization tube used in each of the heat exchanger blocks of the vaporizer of FIG. 1.
Figure 6:
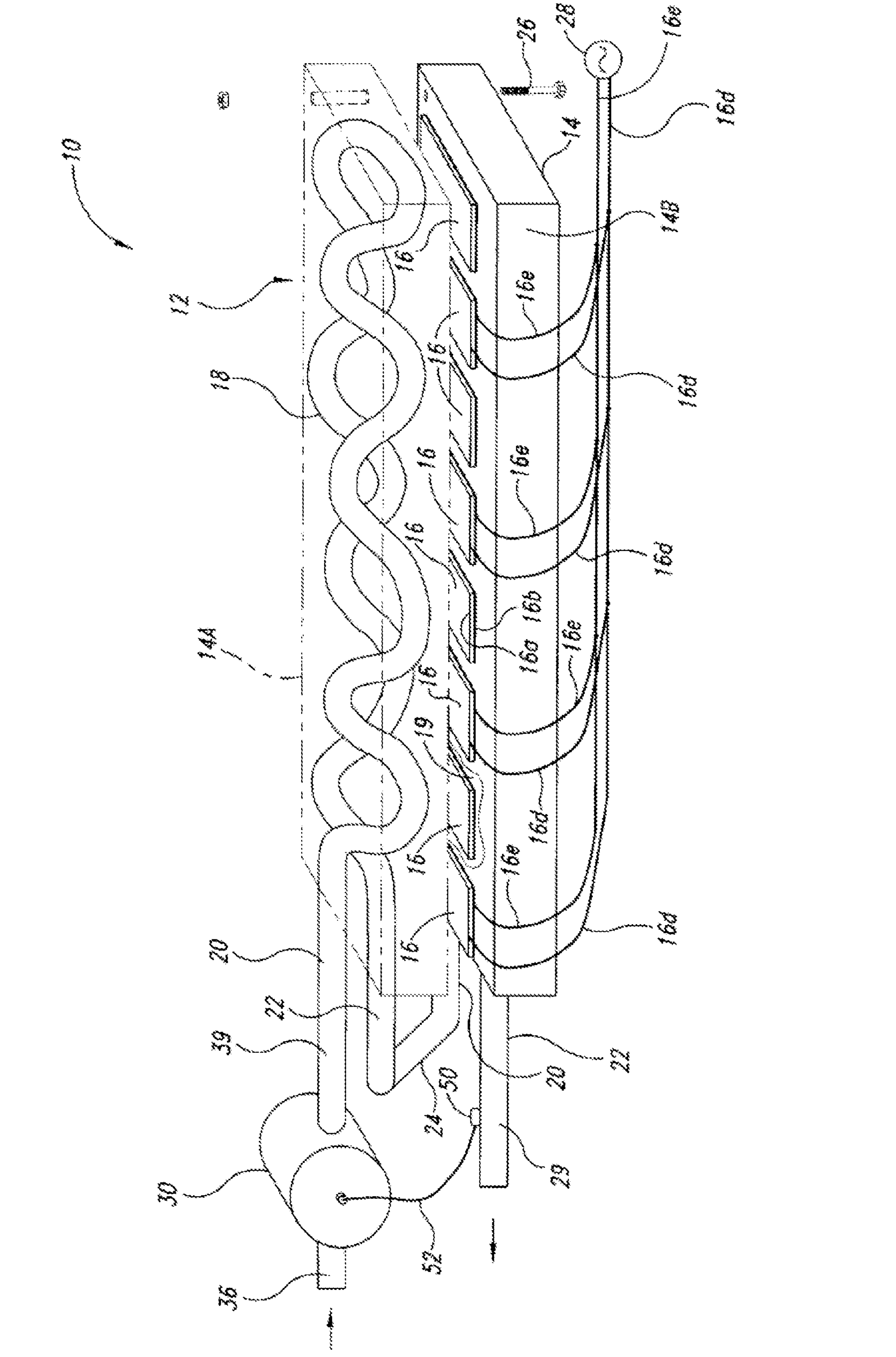
FIG. 6 illustrates the vaporizer of FIG. 1 partially assembled with one of the heat exchanger blocks in phantom lines to better illustrate the vaporization tube encased therein.

Each of the heat exchanger blocks 14 is formed of a rectangular casting of a thermally conductive material, such as aluminum, with an integral vaporization tube 18 encased therein, as shown in FIGS. 3 and 6. Each of the vaporization tubes 18 has an inlet 20 and an outlet 22. The vaporization tubes 18 of the heat exchanger blocks 14 are coupled together in series by a coupler tube 24 connecting the outlet 22 of the vaporization tube 18 of the first heat exchanger block 14A and the inlet 20 of the vaporization tube 18 of the second heat exchanger block 14B.

The heat exchanger blocks 14 are secured tightly together in face-to-face relation with the heating elements 16 sandwiched between them by a plurality of bolts 26, or alternatively other fasteners or clamps. An alternating current electrical power supply 28, operating at 110 to 240 or up to 480 volts, supplies electrical power to the heating elements 16. A capacity control valve 30 is coupled to the inlet 20 of the vaporization tube 18 of the first heat exchanger block 14A and controls the flow of liquefied gas from a liquefied gas source 32, such as a liquefied petroleum gas storage tank, to the heat exchanger 12. The vaporized gas exits through the outlet 22 of the vaporization tube 18 of the second heat exchanger block 14B and is supplied to a gas vapor outlet tube 29.

Figure 4A:
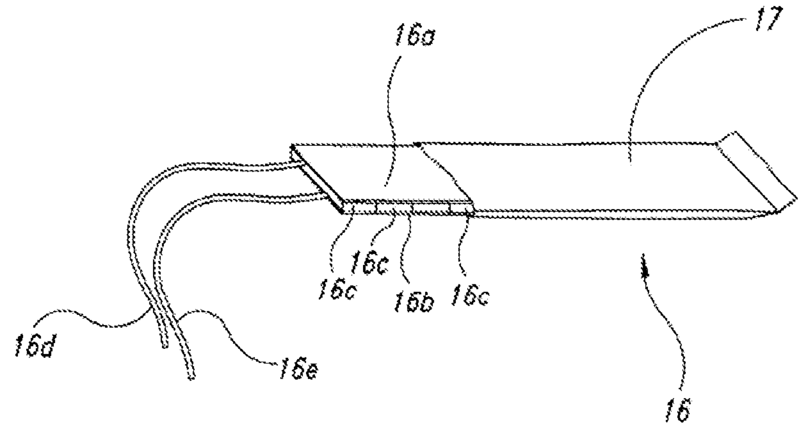
FIG. 4A illustrates a positive temperature coefficient (PTC) heating element used to supply heat to the heat exchanger blocks of the vaporizer of FIG. 1.
Figure 4B:
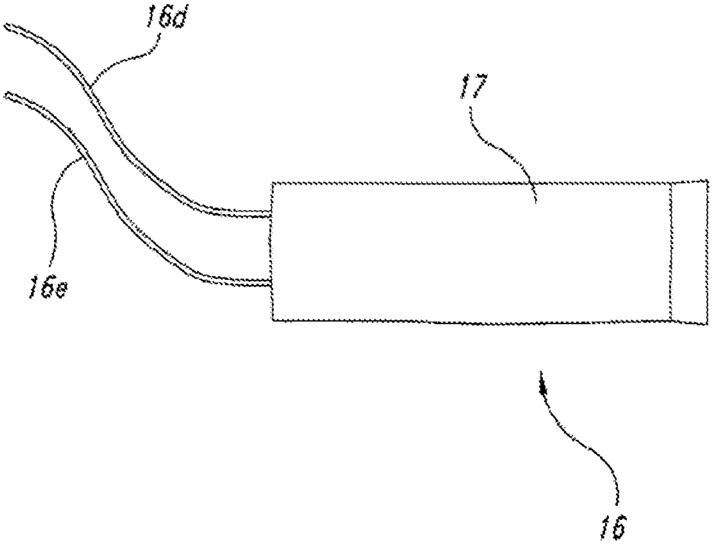
FIG. 4B further illustrates the heating element shown in FIG. 4A.

One of the PTC heating elements 16 used in the vaporizer 10 is shown by itself in FIGS. 4A and 4B. Such PTC heating elements are well-known and include a pair of spaced-apart planar conductive plates 16*a* and 16*b* with a plurality of "stone" elements 16*c* positioned between the conductive plates. The PTC heating elements 16 have a flat, low side profile. An electrical lead 16*d* is attached to the end of one plate and an electrical lead 16*e* is attached to the end of the other plate to supply a voltage across the stones between the conductive plates. The stones 16*c* are arranged in a row between the conductive plates 16*a* and 16*b* with each stone having one face in electrical contact with one conductive plate and an opposite face in electrical contact with the other conductive plate. The PTC heating element may be the EB style, using 5 stones sold by Dekko Enterprise of North Webster, IN.

The stones 16*c* are composed of a thermally sensitive semiconductor resistor material that generates heat in response to a voltage applied across it by the conductive plates 16*a* and 16*b*, and have the characteristic of producing substantially the same heat output regardless of the voltage applied across it. As such, the PTC heating elements 16 produce a very constant heat output independent of the voltage used for the electrical power supply 28. This avoids having to carefully and accurately regulate the power source for the PTC heating elements 16 as is required in conventional electrical heater vaporizers so as to produce the desired heat. This produces a simpler and less expensive vaporizer. It also reduces the need and expenses incurred with conventional vaporizers requiring highly regulated power when adapting them for use in other countries that have very different power supply systems. The PTC heating elements 16 allow wide use without regard for the power supply system providing the electrical power for the heating elements. For example, a sample of the EB style, 5 stone PTC heating elements being used produces a surface temperature ranging from 103 to 117 degrees Centigrade when the voltage ranges from 120 volts to 230 volts, respectively.

Other advantages are realized by using the PTC heating elements 16. As noted, the stones 16*c* are arranged in a row between the conductive plates 16*a* and 16*b* so that if one stone fails, the other stones between the conductive plates continue to operate and produce heat, thus making the heating element resistant to total failures. In this regard, as shown in FIG. 1, the leads 16*d* of the heating elements 16 are connected together, and the leads 16*e* of the heating elements are connected together, such that the heating elements are connected in parallel to the electrical power supply 28. With this arrangement, should one of the heating elements 16 fail completely, the other heating elements will continue to have power supplied and to operate. A large enough number of heating elements 16 are used such that should some of the stones fail in several of the heating elements, or even several of the heating elements completely fail, the other heating elements will still provide enough heat to accomplish the desired vaporization of the liquefied gas supplied to the heat exchanger 12.

Another advantage results from the fact that the PTC heating elements 16 are self-regulating in that they have a cure temperature at which they operate and they will reduce the heat they generate if the temperature of the environment in which they are operating starts to go above their cure temperature. Thus, even though the maximum heat production of the number of PTC heating elements 16 used in the heat exchanger 12 may be more than needed, there is no need to use control circuitry to regulate the supply of power using a varying duty cycling or other control technique for temperature control purposes. The electrical power supplied by the electrical power supply 28 is simply connected directly to the PTC heating elements 16 without fear of producing a dangerous overheated situation where the temperature increases without control. This eliminates the need for expensive heating element temperature control circuitry as required for conventional resistive heating elements and eliminates the fear of overheating. By selecting PTC heating elements with a cure temperature that is just above the saturation temperature of the liquefied gas for which the vaporizer 10 is designed to vaporize, the heat exchanger 12 tends to operate at the selected temperature at all times without a need for power regulation to control the heat generated. As such, there is also no need for a high limit safety circuit as a fail-safe as required in a conventional vaporizer to cut off power to the heating elements should even the heating element temperature control circuitry fail to avoid overheating.

Using the PTC heating elements 16 ensures a self-regulated temperature that, when properly selected, cannot exceed the auto-ignition temperature of gas vapor being produced by the vaporizer 10. The self-regulated temperature is supplied constantly without power cycling that might otherwise generate sparks.

Each of the PTC heating elements 16 is packaged in an electrically isolating jacket 17 formed of a material having a high coefficient of thermal conductivity. The jacket 17 is shown in FIG. 4A partially removed to reveal the conductive plates 16*a* and 16*b* of the PTC heating element 16. Thus, when the PTC heating elements 16 are tightly sandwiched between the conductive metal heat exchanger blocks, to promote good thermal conductivity therewith, the jacket 17 prevents the conductive plates 16*a* and 16*b* of the heating element from making electrical contact with the heat exchanger blocks while at the same time permitting the efficient transfer of the heat generated by the heating element through the jacket to the heat exchanger blocks. The electrically isolating, heat conductive jacket 17 of the PTC heating elements 16 used is made of KAPTON®, a polyamide film presently available from du Pont de Nemours and Company of Wilmington Delaware. The PTC heating element is shown fully inside its jacket 17 in FIG. 4B.

Figure 5:
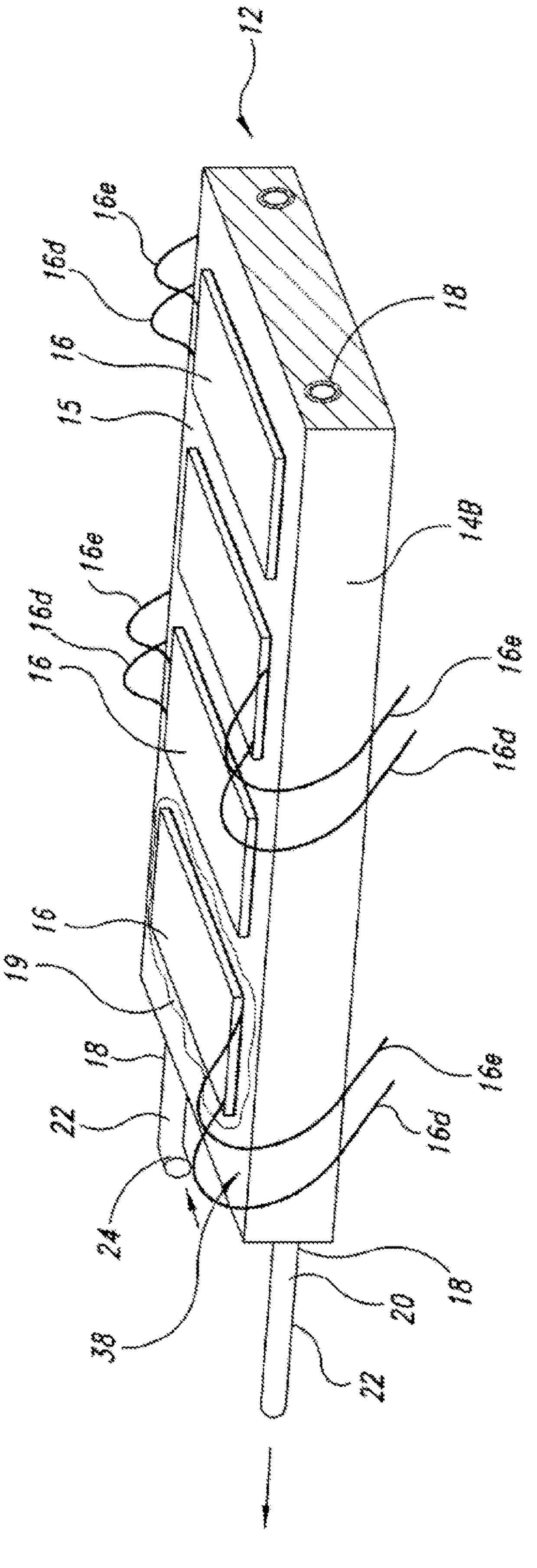
FIG. 5 illustrates one of the heat exchanger blocks showing placement of four of the heating elements of the vaporizer of FIG. 1.

To facilitate good thermal transfer from the PTC heating elements 16 to the heat exchanger blocks 14A and 14B, each of the heat exchanger blocks has a face 15 which is machined flat and the heat exchanger 12 is assembled with the flat faces 15 of the two heat exchanger blocks facing toward each other with the PTC heating elements 16 oriented with one of the conductive plates 16*a* and 16*b* toward the flat face of one of the heat exchanger blocks and the other of the conductive plates toward the flat face of the other heat exchanger blocks. Thus, the heat exchanger blocks 14A and 14B when bolted together using the bolts 26, are separated by only the thickness of one of the PTC heating elements 16 to provide a low side profile to the heat exchanger 12 and a compact design. The flat faces 15 also provide good surface contact with nearly the entire flat exterior surfaces of both faces of the PTC heating elements 16 to facilitate maximum heat transfer to the heat exchanger blocks 14A and 14B. To further facilitate good heat transfer, a heat transfer grease 19 or other medium is applied so it is positioned between the faces of the PTC heating element and the flat face 15 of each of the heat exchanger blocks 14A and 14B, as shown for one heat exchanger block 14B in FIG. 5. While not illustrated in the drawings, to better distribute the heat generated by the heating elements 16, every other heating element is shifted toward one or the other longitudinal edges of the heat exchanger blocks 14A and 14B, such that adjacent heating elements are longitudinally offset from each other.

While the vaporizer 10 has included two heat exchanger blocks 14A and 14B, it is to be understood that a vaporizer can be constructed using more than two heat exchanger blocks stacked atop each other with PTC heating elements 16 therebetween. As such, a vaporizer can be constructed using a modular approach by stacking together the necessary number of heat exchanger blocks with PTC heating elements therebetween to provide the vaporizer with the desired operating characteristics. Alternatively, a vaporizer can be constructed using only a single heat exchanger block with the PTC heating elements 16 mounted thereon. The vaporizer 10 and alternative constructions have a very low profile and compact size, and can be inexpensively manufactured using off the shelf PTC heating elements 16 and other components.

The construction of the vaporizer 10 lends itself to mass manufacture and eliminates much of the expensive control and safety circuitry and other components previously required with vaporizers using electric heating elements. For example, the vaporizer 10 uses no thermostats, control boards, relays or high limit controls. Since the switching elements and circuitry used in conventional electric heater vaporizers have been eliminated, the vaporizer 10 is safer, more reliable and requires less maintenance. The construction of the heat exchanger blocks 14 using a casting with the vaporizer tube 18 formed integrally therein is inherently economical and maintenance free. Further, the vaporizer 10 has a potentially wider applicability since it is simpler and easier to use. It requires few, if any, adjustments or attention by the user so it can be safely used in applications even where a knowledgeable operator is not present.

The shape of the vaporizer tube 18 used in each of the heat exchanger blocks 14 is illustrated FIGS. 3 and 6. The vaporizer tube 18 extends within the heat exchanger block 14 in which it is embedded with a first portion extending from the end at which its inlet 20 is located with a generally serpentine pattern toward the opposite end of the heat exchanger block, and then turns back on itself with a second portion extending above the first portion with a generally serpentine pattern back towards the same end. The vaporizer 18 has its inlet 20 and outlet 22 at the same end of the heat exchanger block. This arrangement facilitates use of the coupler tube 24 to connect the outlet 22 of the vaporizer tube 18 of one heat exchanger block with the inlet 20 of the vaporizer tube of another heat exchanger block stacked on the first when connecting a plurality of heat exchanger blocks together in series.

Figure 7:
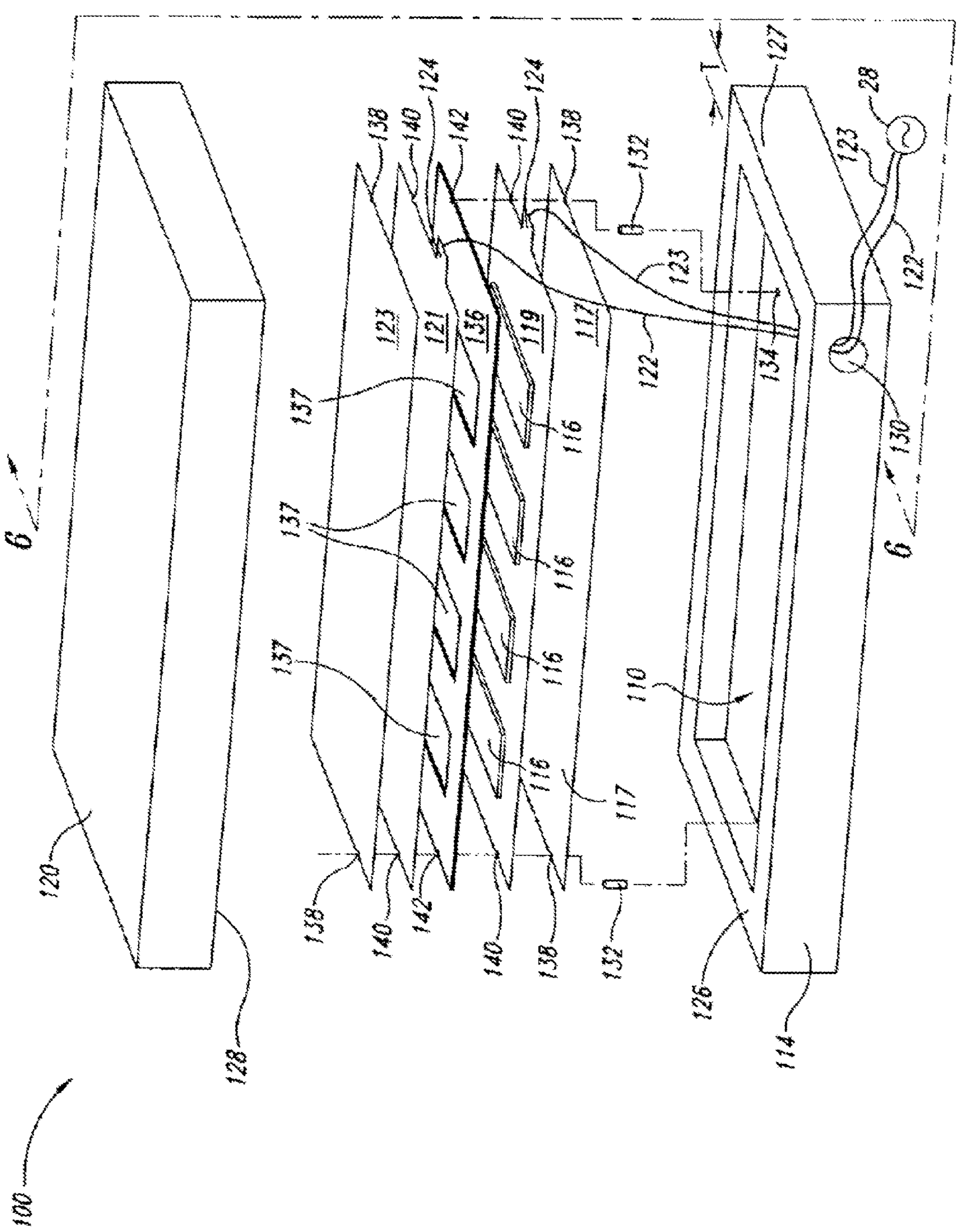
FIG. 7 illustrates another vaporizer and the positioning of components thereof within a cavity in a heat exchanger block.
Figure 8:
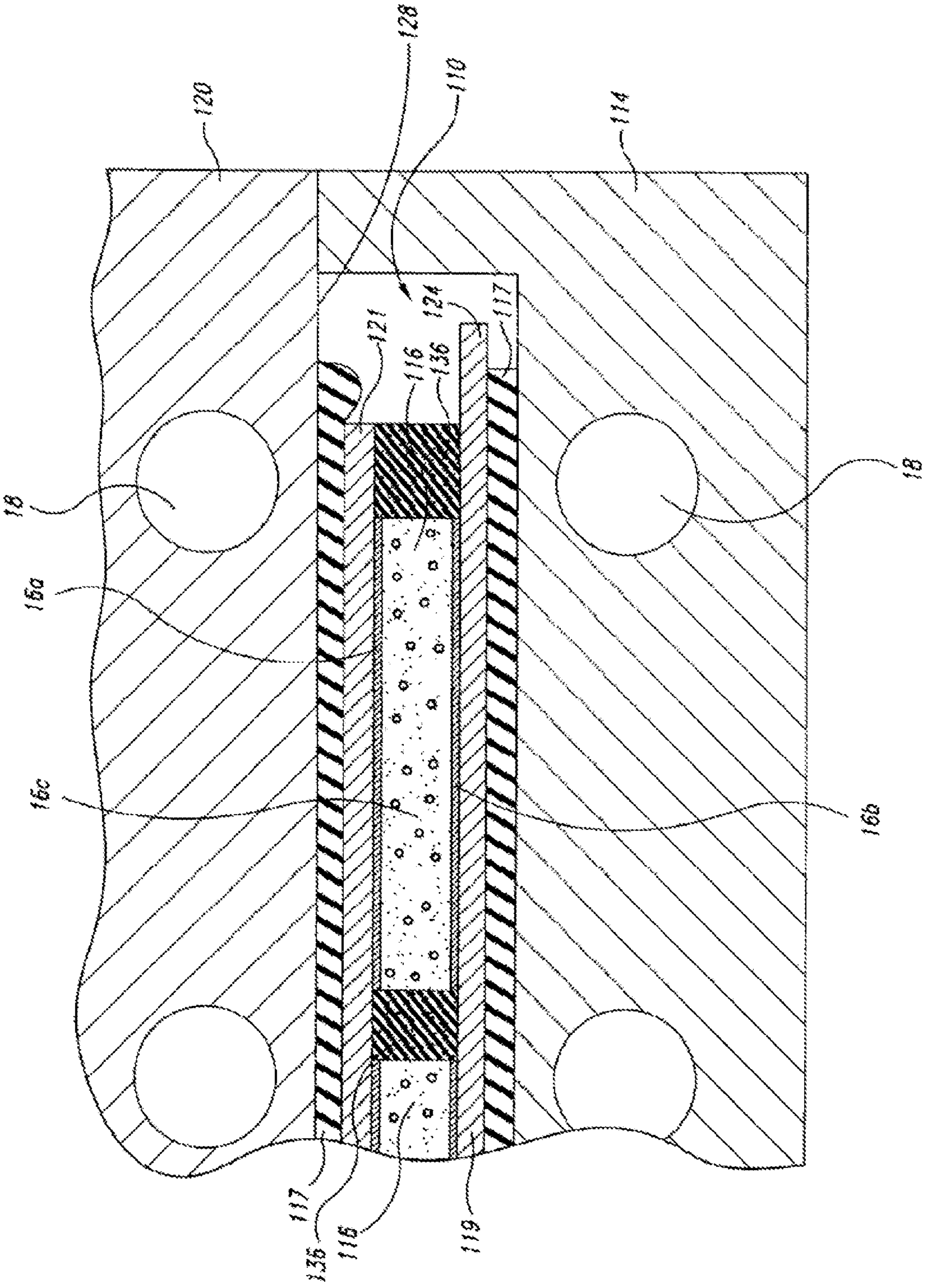
FIG. 8 illustrates a cross-section of the vaporizer of FIG. 7.

FIG. 7 shows an exploded view of a heater 100. FIG. 8 is a cross-sectional view taken along lines 6-6 of FIG. 7. A first heat exchanger block 114 has a surface 126 with a cavity or depression 110 formed therein. A selected minimum wall thickness T is provided on all sides of the cavity. A second heat exchanger block 120 having a surface 128 is configured to mate with the surface 126 of heat exchanger block 114. The blocks 114 and 120 may be constructed by casting aluminum or some other material around tubes, as taught with respect to blocks 14*a* and 14*b*. The block 120 is illustrated in FIG. 8 as having a flat surface 128. Alternatively, the cavity 110 may be formed in both blocks 114 and 120 so that both have identical configurations and are interchangeable. According to an embodiment, the surfaces 126, 128 are not planar but are configured to mutually conform in shape. According to the embodiment illustrated in FIGS. 7 and 8, the cavity 110 has a planar surface to conform to the planar configuration of the heating assembly therein. According to alternative embodiments, the cavity 110 has a nonplanar surface that is configured to conform to a heating element or assembly having a nonplanar shape.

Electrically nonconductive alignment pins 132 are positioned in recesses 134 located toward each end of the cavity 110. Within the cavity 110 is an electrically isolating pad 117 formed of a material having a high coefficient of thermal conductivity. The pad 117 may have a degree of resilience and conformability, to conform to surface voids and irregularities, thus maintaining a maximum degree of contact for thermal transfer. The pad 117 includes alignment notches 138, which engage the alignment pins 132. Next to the pad 117 is a first power bus plate 119, which includes alignment notches 140 that engage the pins 132. A resilient and nonconductive alignment mask 136 is positioned adjacent the first bus plate 119. The mask 136 is provided with alignment notches 142 to engage the pins 132, and a plurality of cutouts 137.

A PTC heating element 116 is positioned in each respective cutout 137 of the mask 136, along the length of the bus plate 119. The PTC heating elements 116 are similar in construction to those previously described with reference to FIGS. 4A and 4B. In this embodiment, they do not include the individual electrical connections 16*d* and 16*e*. Additionally, they do not employ electrically insulating jackets 17 because they are connected to a common bus, as is explained herein.

Above the PTC heating elements 116 is a second power bus plate 121, and then a second electrically isolating pad 123 with respective alignment notches 140 and 138. The second heat exchanger block 120 is clamped to the first block 114 with the above listed components therebetween. The power bus plates 119 and 121 can be composed of aluminum, copper, steel, a silver coated substrate or any acceptable conductors. One plate 119 is coupled to one side of all the PTC elements 116 in parallel while the other plate 121 is coupled to the other side of all the PTC elements 116 in parallel. Power passes from bus 119, through elements 116 and into bus 121 to provide heating of all the elements in parallel, having the advantages as described elsewhere herein.

The electrically isolating pads 117, 123 have some degree of resiliency, such that the pressure of the clamping of the first and second heat exchanger blocks 114 and 120 compresses the pads 117, 123, which conform to the surfaces of the respective power bus plates 119, 121 on one side and the surfaces of the respective heat exchanger blocks 114, 120 on the other. Pressure is evenly maintained between the aluminum bus plates 119, 121 and the upper and lower surfaces of the PTC heating elements 116. A pressure is selected that ensures a dependable electrical connection between the power bus plates 119, 121 and the PTC elements 116, such that the conductive plates 16*b* and 16*a* are in electrical contact with the bus plates 119 and 121, respectively. Each power bus plate 119, 121 includes a contact tab 124. Electrical connection wires 122, 123 from a power source 28 make contact with the power bus plates 119, 121 at contact tabs 124. An aperture 130 passing from the outside of the device 100 into the cavity 110 provides passage of the connections 122, 123 into the device. The aperture 130 may be closed by an explosion-proof seal configured to permit passage of the connection wires 122, 123. Such seals are well-known in the industry and are used in other applications where combustion or explosion are a concern. Electrical power is provided via the electrical connection wires 122, 123 to the contact tabs 124 of the power bus plates 119, 121, and thence to each of the PTC heating elements 116.

The cavity 110 is of the proper depth such that when the heat exchanger blocks 114 and 120 are clamped together, the pads 117, power supply bus plates 119, 121 and PTC elements 116 are appropriately biased together, the surface 126 of block 114 is pressed against the surface 128 of block 120. This is to provide an explosion-proof assembly.

Regulations governing safety ratings and certifications of devices such as those described herein specify that, in order to be certified as safe for use in a given environment, the device must have features that fall within prescribed limits. For example, to be certified as explosion-proof, according to some regulatory standards, a device used to vaporize flammable liquids must have a minimum selected wall thickness between a combustion source and the exterior of the device. The systems described herein provide walls of blocks 114 and 120 that meet this standard. For example, thickness T of sidewall 127 is selected to meet or exceed this minimum thickness.

In addition, passages in the wall or gaps between the two blocks 114 and 120 may be provided as vents to release pressure in the event of an internal combustion to avoid an explosion. If the vents are of the proper size, sufficient pressure cannot build up to cause an explosion. There is a relationship between the selection of the length and width of the gap or passages to provide the proper pressure release while ensuring that any flame occurring within the device cannot reach the exterior. Additionally, the overall volume and capacity of the device affect the parameters to be met for such certification. A device according to the embodiment of FIGS. 7 and 8 is configured to conform to a hazardous area rating Class I, Division 1, as described by the National Electrical Code (NEC). The device is thus rated sufficiently safe that, even if used in areas with the potential for explosive conditions, it will not explode nor initiate combustion in flammable materials that might be nearby. Previous vaporizers and heaters having similar capacities have required a separate protective casing to conform to safety standards.

The heat exchanger blocks 114 and 120 may be configured to mate together to completely enclose the heating elements, power connections, and fluid heating tubes. The unit will thus comply with NEC standards without the need for additional shielding. The result is a significant reduction in cost of manufacture of the inventive device over known heaters and vaporizers. The blocks 114 and 120 provide the many purposes of enclosing the tubes, enclosing the heating elements, functioning as heat exchangers, and also providing the explosion-proof enclosure.

It will be recognized that the explosion-proof nature of the heat exchanger blocks illustrated in FIGS. 7 and 8 is independent of the type of heating element employed. Thus, PTC elements in configurations other than those disclosed herein, as well as other types of heating coils and elements used with heat exchanger blocks that encapsulate the elements, may also be used. Inner surfaces of the cavity 110 need not be planar, but rather need only conform to the shape of the heating element being employed, in order to maximize the efficiency of the exchange of heat to the blocks 114 and 120 while providing an explosion-proof seal.

Each of the heat exchanger blocks 114 and 120 may be provided with a cavity of about half the depth of the single cavity 110 of FIGS. 7 and 8, with the cavities positioned opposite each other such that a cavity of the required dimensions is formed by a combination of the two cavities. A possible advantage of this configuration is that the blocks 114 and 120 could be designed to be identical, thus simplifying the manufacture and assembly of the device. In applications where explosion-proofing is not an issue, whether because the environment in which it will be used does not require it, or because the fluid to be heated is not flammable, it is not required that a cavity be present, and the heat elements can be positioned between the blocks and sealed as appropriate for the desired application.

According to one embodiment, a cavity is not formed within the heat exchanger blocks, but rather, is formed by the inclusion of a plate, having an aperture passing from one side to another, sandwiched between the blocks. The openings of the aperture are on surfaces of the plate that are in contact with the heat exchanger blocks, and the aperture is sized to receive a heating element therein.

Operation of the device is as follows. A voltage supply is provided by a power source 28 to the heater 100 via electrical connection wires 122 and 123. The power bus plates 119 and 121 are provided electrical power through contact with the connection wires 122 and 123. The PTC heating elements are each connected to the power supply through the bus plates 119 and 121. The PTC heating elements 116 heat up to their cure temperature. Heat from the elements 116 is conducted through the power bus plates 119 and 121 and the electrical isolating pads 117 to the heat exchanger blocks 114 and 120. Heat is transmitted to fluid in the fluid heating tubes 18 where the fluid is heated or vaporized. The maximum rate of flow of fluid in the tubes 18 is regulated by the capacity control valve 30 to ensure that the fluid reaches the desired temperature. In some cases, the desired temperature may be at about the boil point for the fluid being heated, such as water, liquefied petroleum products, or some other fluid. For some fluids and uses, the temperature may be selected to ensure that the fluid is fully vaporized at the exit. Because of the self-regulating nature of the PTC elements 116, the elements 116 will automatically modify their current draw from the supply voltage 28, up to the maximum power rating of the elements to accommodate changes in the temperature or rate of flow of fluid entering the device.

The embodiment of FIGS. 7 and 8 has several advantages. In particular, use of the bus plates 119, 121 obviates the need for the individual connectors 16*d* and 16*e*, resulting in a simplified connection that is less expensive to manufacture and less prone to breakdown, resulting in a more economical and more dependable device.

Figure 9:
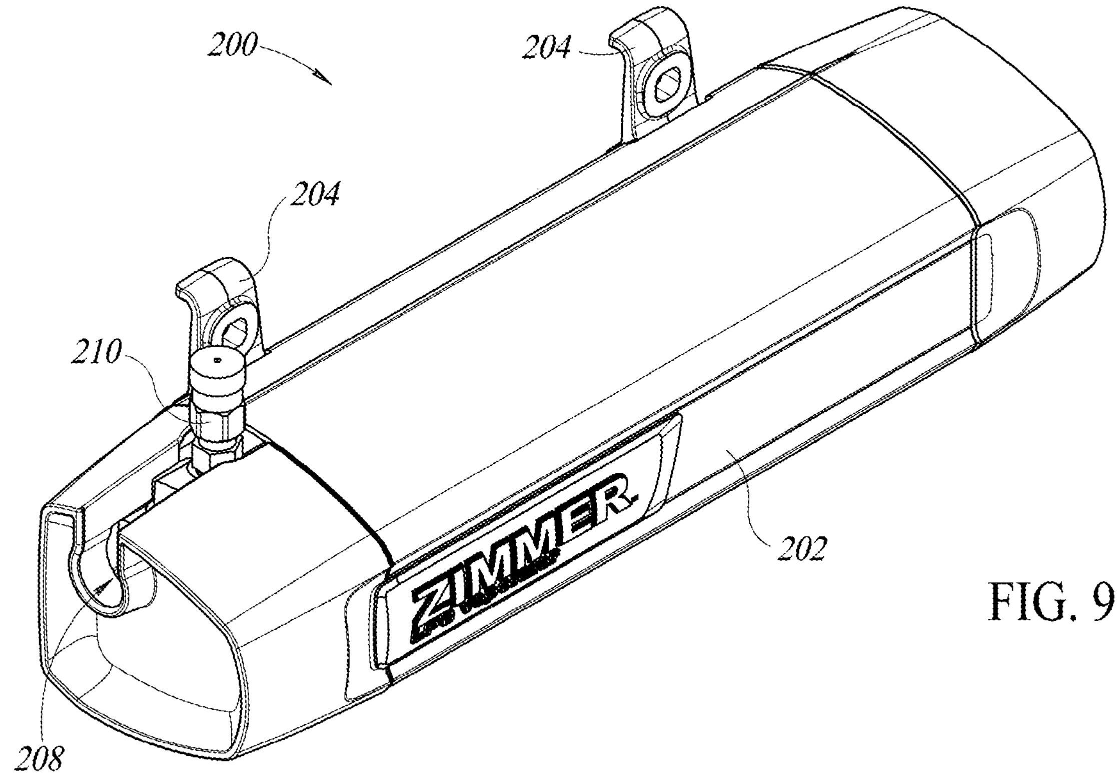
FIG. 9 illustrates another vaporizer having a heat exchanger.
Figure 10:
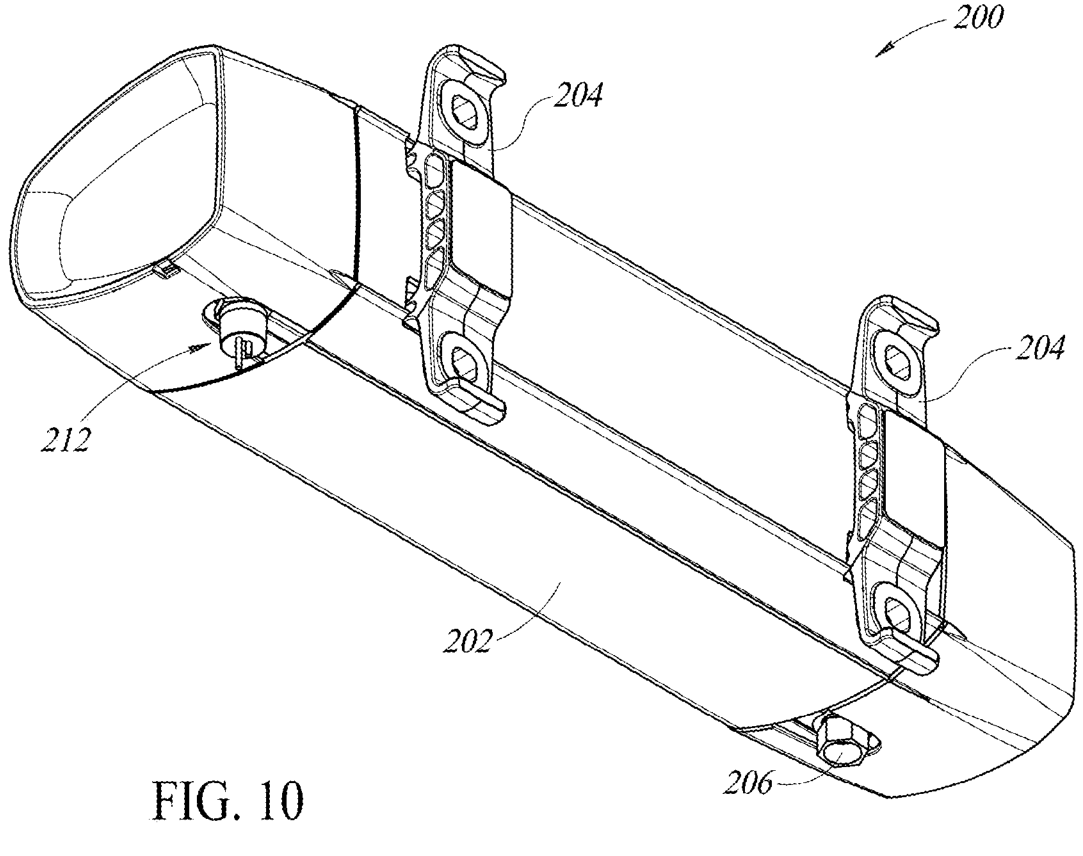
FIG. 10 further illustrates the vaporizer of FIG. 9.

FIGS. 9 and 10 illustrate front, top, and left side, and rear, bottom, and right side perspective views, respectively, of a liquefied gas heater and/or vaporizer 200. As illustrated in FIGS. 9 and 10, the vaporizer 200 may include an outer casing, or shell, or housing 202, and a pair of mounting brackets 204 configured to couple the vaporizer 200 to other objects, such as to a wall, a tank of liquefied gas, or a stand. As also illustrated in FIGS. 9 and 10, the vaporizer 200 has an inlet 206 configured to receive a liquefied gas to be vaporized, an outlet 208 configured to release vaporized gasses, and a relief valve 210 proximate the outlet 208 that is configured to relieve excess pressure in the heat exchanger in the event a pressure of the vaporized gasses rises above a threshold level. The vaporizer 200 also includes an electrical port 212 configured to be coupled to other electrical devices or systems, such as a source of electrical power and/or an electrical control system for the vaporizer 200.

The vaporizer 200 and its components may include any of the features and functionality described elsewhere herein for other vaporizers and their components. For example, the inlet 206 may correspond to and have the features and functionality described with respect to the valve inlet 34 of liquefied gas vaporizer 10 as illustrated in FIGS. 1 and 2. As another example, the outlet 208 may correspond to and have the features and functionality described with respect to the outlet 22 of the heat exchanger 12 as illustrated in FIGS. 1-3. Any of the components described with respect to vaporizer 200 may similarly have the features and functionality of corresponding components of other vaporizers described herein.

Figure 11:
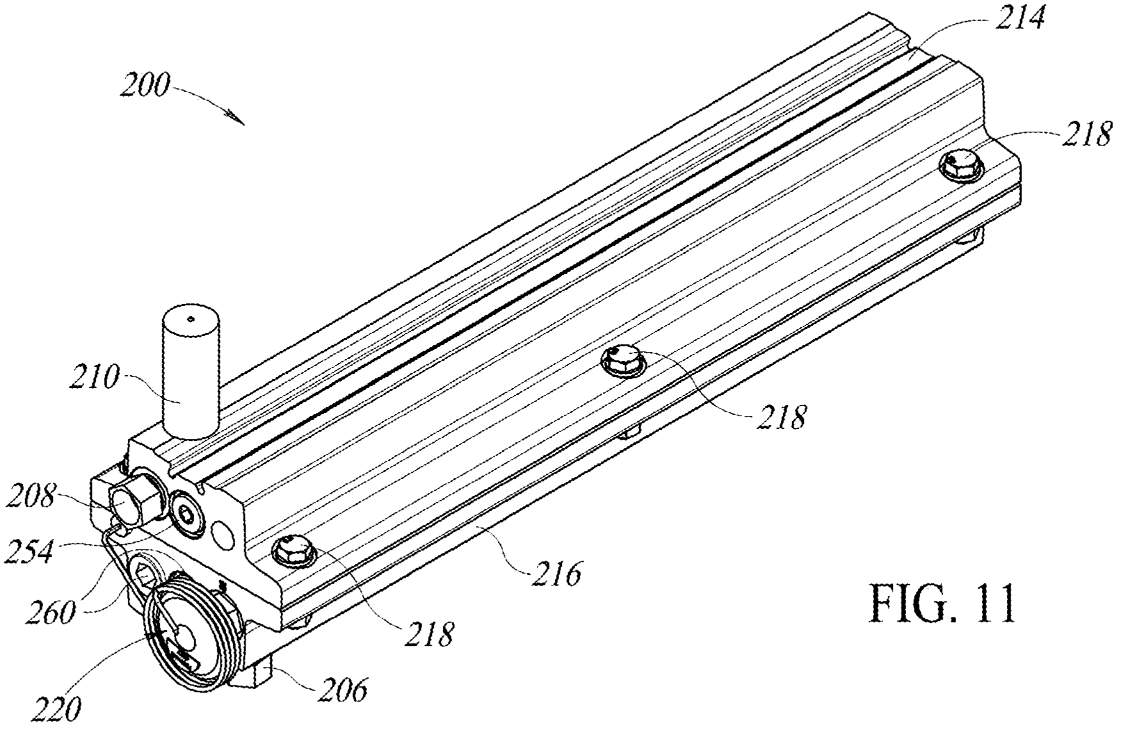
FIG. 11 illustrates the vaporizer of FIG. 9 with a housing thereof removed.
Figure 12:
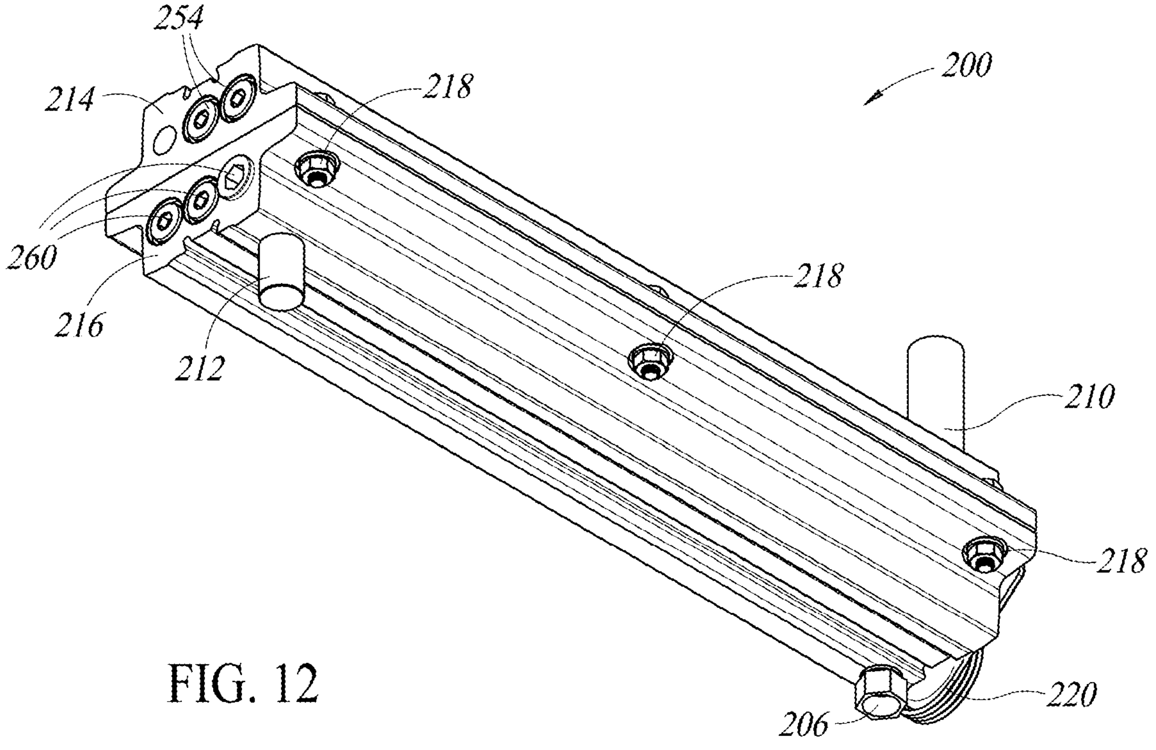
FIG. 12 further illustrates the vaporizer of FIG. 9 with the housing thereof removed.

FIGS. 11 and 12 illustrate front, top, and left side, and rear, bottom, and right side perspective views, respectively, of the vaporizer 200 with the housing 202 and mounting brackets 204 removed to illustrate other internal components. As illustrated in FIGS. 11 and 12, the vaporizer 200 includes a first heat exchanger block 214 and a second heat exchanger block 216, and the first and second heat exchanger blocks 214 and 216 may be bolted together by a plurality of (e.g., six, eight, ten, or twelve) bolts 218. While FIGS. 11 and 12 illustrate that the vaporizer 200 includes two distinct heat exchanger blocks coupled to one another by a plurality of bolts, in other embodiments, the vaporizer 200 may include a single heat exchanger block or two distinct heat exchanger blocks coupled to one another by different mechanisms, such as those described herein with respect to FIGS. 23-26. The first and second heat exchanger blocks 214 and 216 can have any of the features and functionality of other heat exchanger blocks described herein, such as blocks 14A and 14B as illustrated in FIGS. 1 and 6.

As illustrated in FIGS. 11 and 12, the first heat exchanger block 214 has an outer surface that faces away from the second heat exchanger block 216. This outer surface of the first heat exchanger block 214 has a longitudinal channel formed therein that extends along a length of the first heat exchanger block 214 and that may be formed by extrusion as described elsewhere herein. As further illustrated in FIGS. 11 and 12, the first heat exchanger block 214 and its longitudinal channel further include first and second undercut grooves that extend along a length of the first heat exchanger block 214 and that may be formed by extrusion as described elsewhere herein. For example, a first one of the grooves extends from a bottom of the channel further into the first exchanger block 214 and away from a second one of the grooves, and the second one of the grooves extends from a bottom of the channel further into the first heat exchanger block 214 and away from the first one of the grooves.

As similarly illustrated in FIGS. 11 and 12, the second heat exchanger block 216 has an outer surface that faces away from the first heat exchanger block 214. This outer surface of the second heat exchanger block 216 has a longitudinal channel formed therein that extends along a length of the second heat exchanger block 216 and that may be formed by extrusion as described elsewhere herein. As further illustrated in FIGS. 11 and 12, the second heat exchanger block 216 and its longitudinal channel further include first and second undercut grooves that extend along a length of the second heat exchanger block 216 and that may be formed by extrusion as described elsewhere herein. For example, a first one of the grooves extends from a bottom of the channel further into the second exchanger block 216 and away from a second one of the grooves, and the second one of the grooves extends from a bottom of the channel further into the second heat exchanger block 216 and away from the first one of the grooves.

The channels and grooves formed in the outer surfaces of the first and second heat exchanger blocks 214 and 216 form keyways or female portions of key-and-keyway or male-female coupling systems. Thus, a key portion or a male portion of such coupling systems may include protrusions corresponding to, matching, or forming counterparts to the channels and grooves of the heat exchanger blocks 214 and 216, such that the when the protrusions are inserted into the channels and grooves, such as by sliding them longitudinally into, through, and along the channel and grooves, the key or male portion of the locking system is locked to the respective heat exchanger block. One such key or male portion may be coupled in such a manner to one heat exchanger block of a first vaporizer as described herein and to one heat exchanger block of a second vaporizer as described herein, to stack up the vaporizers, which may be fluidically coupled to one another with external plumbing to increase the overall capacity of the heater or vaporizer system. In this way, the heater or vaporizers described herein may be modularized such that heaters or vaporizers of different capacities or with different ratings may be assembled from different numbers of smaller heater or vaporizer component parts.

The vaporizer 200 also includes an inlet capacity control valve 220, which can be configured to control the flow of liquefied gas to and through the inlet 206. The inlet capacity control valve 220 can have any of the features and functionality of other inlet capacity control valves described herein, such as the capacity control valve 30 illustrated in FIGS. 1 and 2.

Figure 13:
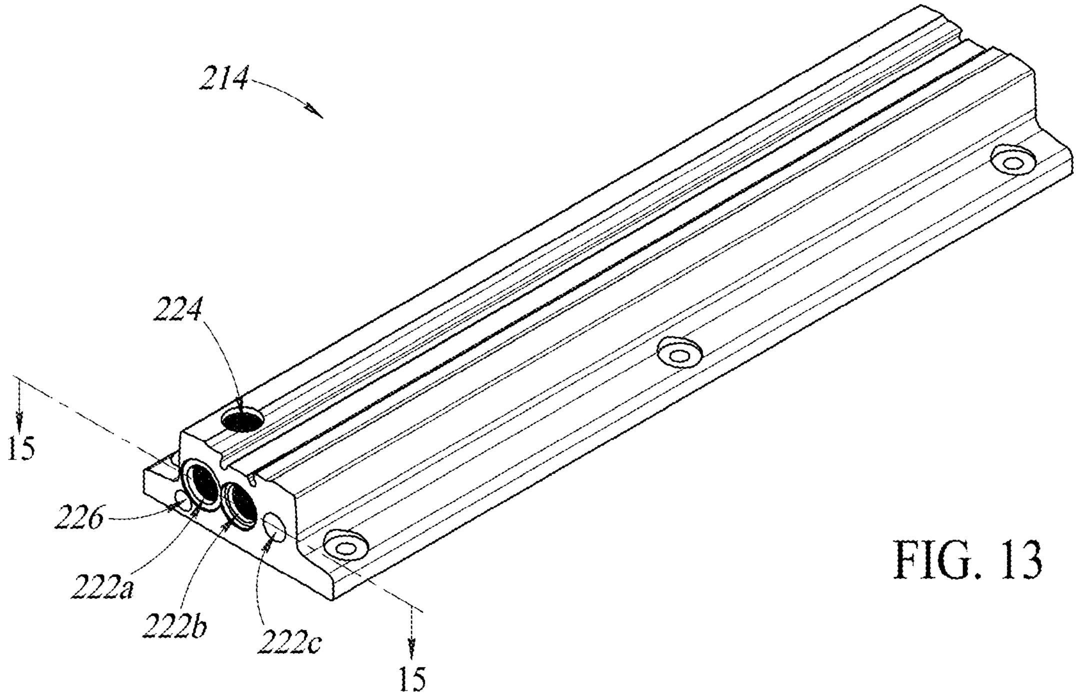
FIG. 13 illustrates a first heat exchanger block of the vaporizer of FIG. 9.
Figure 14:
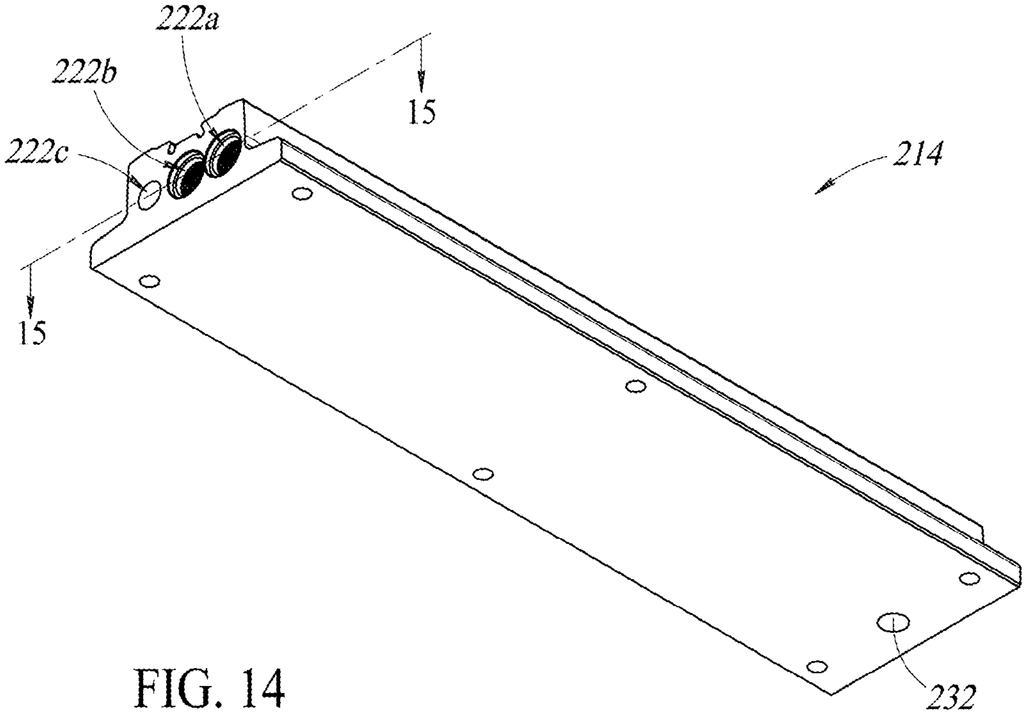
FIG. 14 further illustrates the first heat exchanger block of the vaporizer of FIG. 9.
Figure 15:
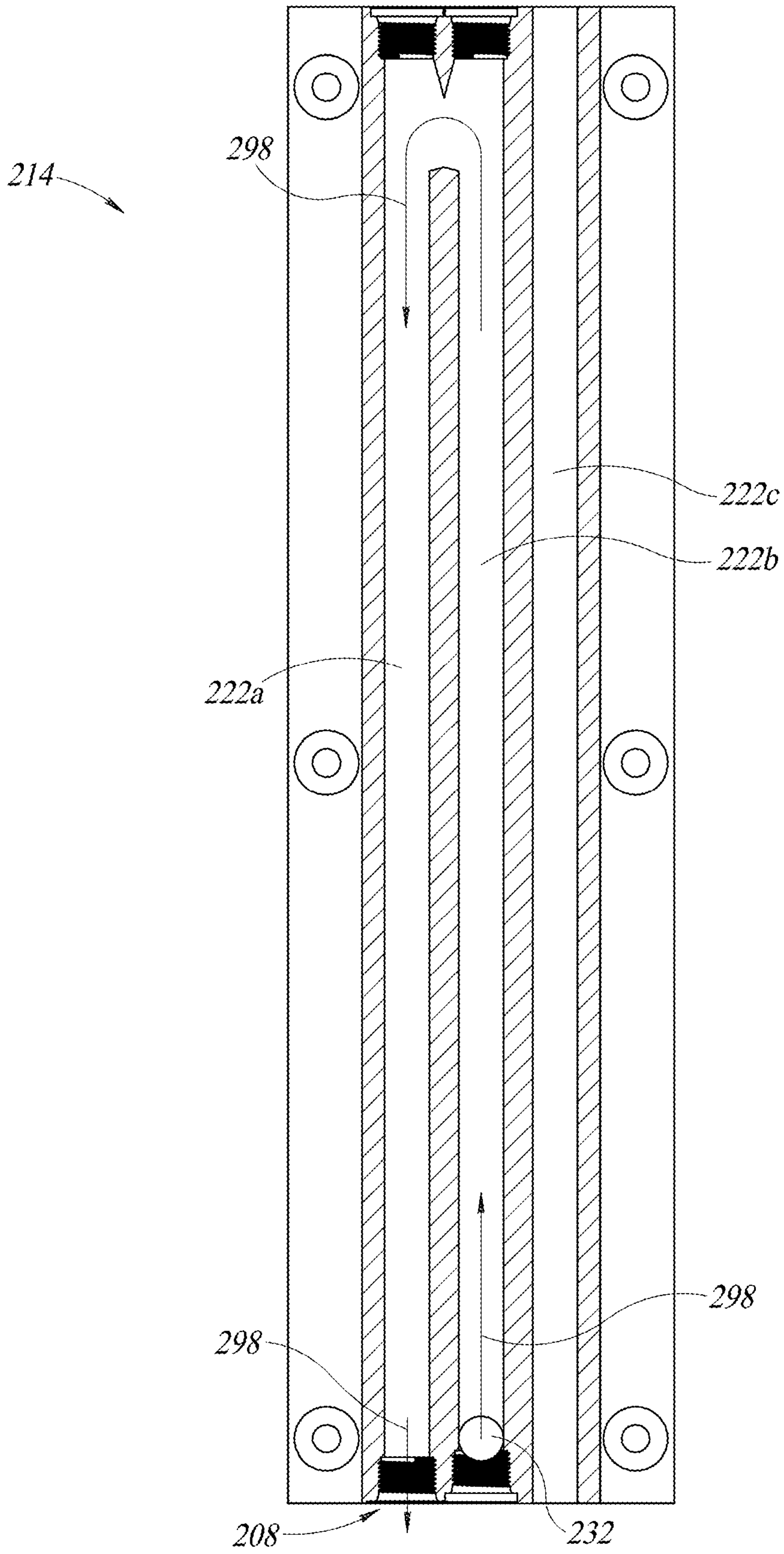
FIG. 15 illustrates a cross-sectional view of the heat exchanger block of FIGS. 13 and 14 taken along line 15-15 in FIGS. 13 and 14.

FIGS. 13 and 14 illustrate front, top, and left side, and rear, bottom, and right side perspective views, respectively, of the first heat exchanger block 214 by itself. FIG. 15 illustrates a cross-sectional view of the first heat exchanger block 214 taken along line 15-15 in FIGS. 13 and 14. As illustrated in FIGS. 13-15, the first heat exchanger block 214 has three linear, parallel conduits 222*a*, 222*b*, and 222*c* that each extend through the first heat exchanger block 214 along the length thereof and parallel to a central longitudinal axis thereof, from a first end thereof (illustrated in FIG. 13) to a second end thereof (illustrated in FIG. 14) that is opposite to the first end thereof along its length. Each of the conduits 222 may have a constant cross-sectional shape and size along its entire length, except that the terminal ends of the conduits 222 may have other shapes or sizes, and/or be threaded so that they can receive other components, and so that the other components can be coupled thereto, in a straightforward manner.

As illustrated in FIG. 13, the first heat exchanger block 214 includes a transverse port or conduit 224 that extends through the first heat exchanger block 214 along an axis transverse or perpendicular to the linear conduits 222 from an outer surface of the heat exchanger block 214 to the first linear conduit 222*a*. The transverse conduit 224 can have threads formed therein at an end of the conduit 224 proximate the outer surface of the first heat exchanger block 214, so that the relief valve 210 can be coupled and secured to the threads and within the transverse conduit 224. As also illustrated in FIG. 13, the first heat exchanger block 214 includes a longitudinal bore or borehole or pocket 226 that extends into the first end of the first heat exchanger block 214 along an axis parallel to the linear conduits 222 at a location adjacent to the first linear conduit 222*a*.

The borehole 226 may be formed by extrusion as described for other features elsewhere herein, or may be formed by machining after an initial extrusion is formed. The borehole 226 can be configured to receive a portion of the inlet capacity control valve 220, such as a thermocouple or other temperature sensor thereof, such that the temperature sensor measures a temperature of the vaporized gas travelling through the adjacent linear conduit 222*a* closely but without disrupting its flow. By positioning the temperature sensor at such a location, an amount of time required to start-up the vaporizer 200, such as an amount of time it takes for the inlet capacity control valve 220 to open, can be reduced, replacement of the temperature sensor is made more efficient, and the temperature sensor can be made for a lower cost, such as by avoiding plating the temperature sensor and/or avoiding positioning the temperature sensor in a thermal well.

FIG. 14 illustrates a first surface of the first heat exchanger block 214 that faces toward and abuts against the second heat exchanger block 216 when the vaporizer 200 is assembled. As illustrated in FIG. 14, the first heat exchanger block 214 includes a transverse port or conduit 232 that extends through the first heat exchanger block 214 along an axis transverse or perpendicular to the linear conduits 222. The transverse conduit 232 extends from the first surface of the heat exchanger block 214, which faces toward and abuts against the second heat exchanger block 216 when the vaporizer 200 is assembled, to the second linear conduit 222*b* at a location proximate the first end of the heat exchanger block 214. In some cases, a center of the transverse conduit 232 can be located at a first distance from the first end of the first heat exchanger block and a second distance from the second end of the heat exchanger block, where the first distance is less than 25%, less than 20%, less than 15%, less than 10%, or less than 5% of the total length of the first heat exchanger block 214.

Figure 16:
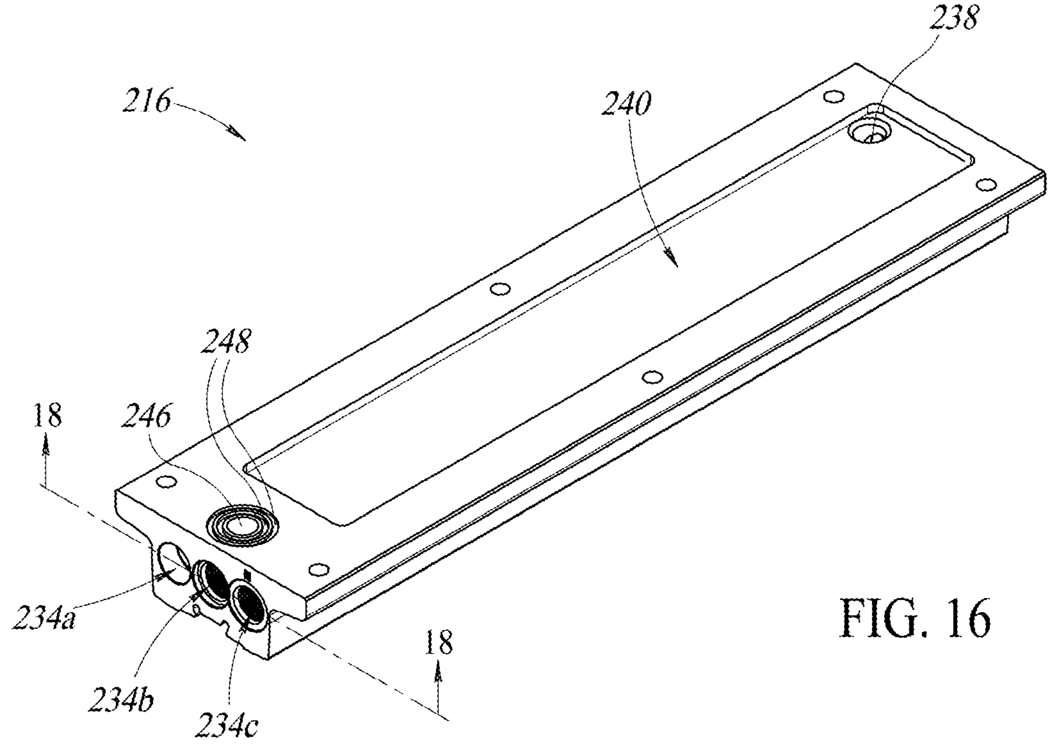
FIG. 16 illustrates a second heat exchanger block of the vaporizer of FIG. 9.
Figure 17:
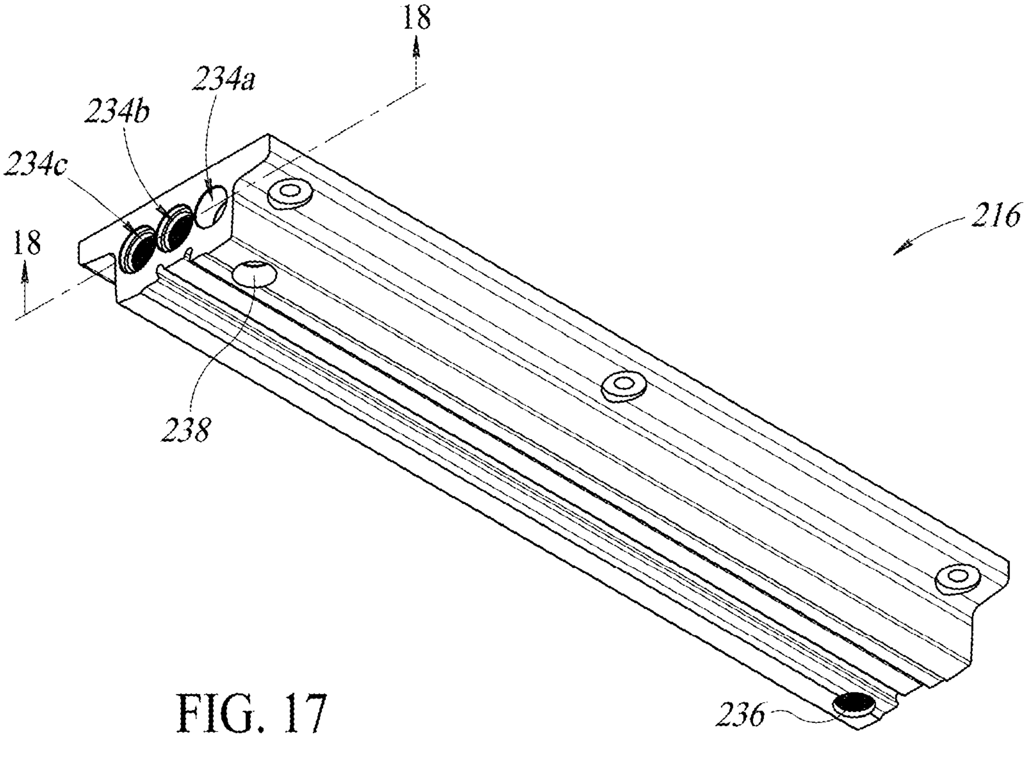
FIG. 17 further illustrates the second heat exchanger block of the vaporizer of FIG. 9.
Figure 18:
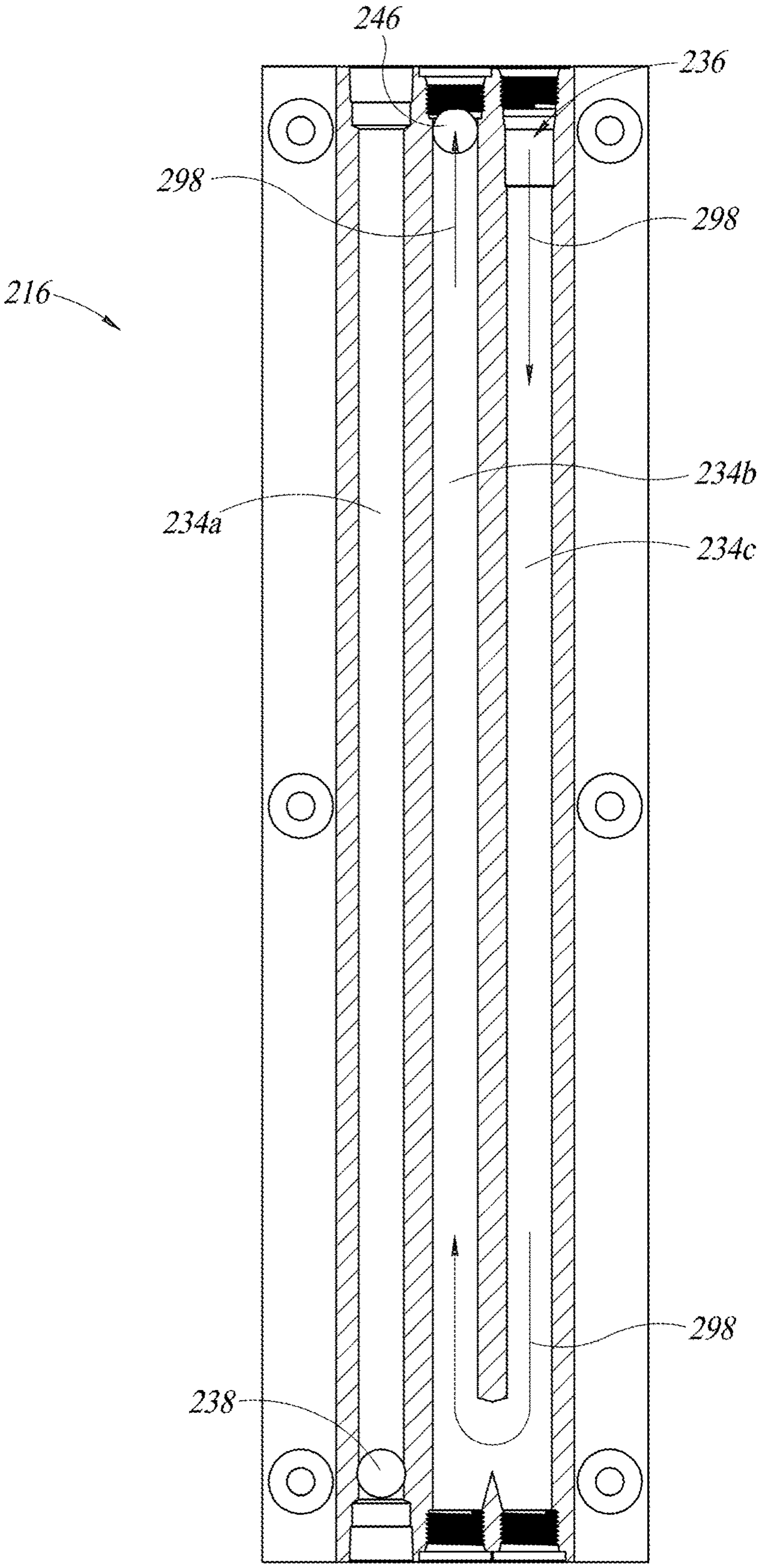
FIG. 18 illustrates a cross-sectional view of the heat exchanger block of FIGS. 16 and 17 taken along line 18-18 in FIGS. 16 and 17.

FIGS. 16 and 17 illustrate front, top, and left side, and rear, bottom, and right side perspective views, respectively, of the second heat exchanger block 216 by itself. FIG. 18 illustrates a cross-sectional view of the second heat exchanger block 216 taken along line 18-18 in FIGS. 16 and 17. As illustrated in FIGS. 16-18, the second heat exchanger block 216 has three linear, parallel conduits 234*a*, 234*b*, and 234*c* that each extend through the second heat exchanger block 216 along the length thereof and parallel to a central longitudinal axis thereof, from a first end thereof (illustrated in FIG. 16) to a second end thereof (illustrated in FIG. 17) that is opposite to the first end thereof along its length. Each of the conduits 234 may have a constant cross-sectional shape and size along its entire length, except that the terminal ends of the conduits 234 may have other shapes or sizes, and/or be threaded so that they can receive other components, and so that the other components can be coupled thereto, in a straightforward manner.

As illustrated in FIG. 17, the second heat exchanger block 216 includes a transverse port or conduit 236 that extends through the second heat exchanger block 216 along an axis transverse or perpendicular to the linear conduits 234 from an outer surface of the heat exchanger block 216 to the third linear conduit 234*c*. The transverse conduit 236 can have threads formed therein at an end of the conduit 236 proximate the outer surface of the second heat exchanger block 216, so that an inlet fitting at the inlet 206 can be coupled and secured to the threads and within the transverse conduit 236. In some cases, a center of the transverse conduit 236 can be located at a first distance from the first end of the first heat exchanger block and a second distance from the second end of the heat exchanger block, where the first distance is less than 25%, less than 20%, less than 15%, less than 10%, or less than 5% of the total length of the second heat exchanger block 216.

As also illustrated in FIG. 17, the second heat exchanger block 216 includes another transverse port or conduit 238 that extends through the second heat exchanger block 216 along an axis transverse or perpendicular to the linear conduits 234 from an outer surface of the heat exchanger block 216 to the first linear conduit 234*a*. The transverse conduit 238 can have threads formed therein at an end of the conduit 238 proximate the outer surface of the second heat exchanger block 216, so that an electrical fitting at the electrical port 212 can be coupled and secured to the threads and within the transverse conduit 238.

FIG. 16 illustrates a first surface of the second heat exchanger block 216 that faces toward and abuts against the first heat exchanger block 214, such as the first surface thereof, when the vaporizer 200 is assembled. As illustrated in FIG. 16, the second heat exchanger block 216 includes a recess or a pocket 240 formed in the first surface thereof that is configured to receive other components, such as electric heaters, of the vaporizer 200 when it is assembled. As also illustrated in FIG. 16, the second heat exchanger block 216 includes a transverse port or conduit 246 that extends through the second heat exchanger block 216 along an axis transverse or perpendicular to the linear conduits 234. The transverse conduit 246 extends from the first surface of the heat exchanger block 216, which faces toward and abuts against the first heat exchanger block 214 when the vaporizer 200 is assembled, to the second linear conduit 234*b* at a location proximate the first end of the heat exchanger block 216. In some cases, a center of the transverse conduit 246 can be located at a first distance from the first end of the first heat exchanger block and a second distance from the second end of the heat exchanger block, where the first distance is less than 25%, less than 20%, less than 15%, less than 10%, or less than 5% of the total length of the second heat exchanger block 216. Further, the center of the transverse conduit 246 can be aligned with the center of the transverse conduit 232 when the vaporizer 200 is assembled, such that the transverse conduits 232 and 246 can collectively form a conduit that couples the second linear conduit 222*b* to the second linear conduit 234*b* proximate terminal ends thereof at the first ends of the first and second heat exchanger blocks 214, 216.

As illustrated in FIG. 16, the first surface of the second heat exchanger block 216 also includes two circular grooves 248 formed therein that are each concentric with the transverse conduit 246. Each of the grooves 248 is configured to receive a gasket or seal that engages with the first surface of the first heat exchanger block 214 when the vaporizer 200 is assembled to seal the respective surfaces of the first and second heat exchanger blocks 214, 216 to one another, such as to prevent liquefied gas or vaporized gasses escaping or leaking from the vaporizer 200, and/or to prevent ingress of contaminants such as water into the conduits within the first and second heat exchanger blocks 214, 216.

In some embodiments, each of the first and second heat exchanger blocks 214 and 216 may comprise a single piece of aluminum, and may be fabricated by extruding aluminum through a single extruder die and then machining the resulting single-piece extrusion. Further, in some embodiments, the first heat exchanger block 214 may be fabricated by extruding aluminum through an extruder die and then machining the resulting single-piece extrusion, and the second heat exchanger block 216 may be fabricated by extruding aluminum through the same extruder die and then machining the resulting single-piece extrusion. In some further embodiments, the first and second heat exchanger blocks 214 and 216 may be fabricated by extruding aluminum through an extruder die to form a single-piece aluminum extrusion, then cutting the single-piece aluminum extrusion in half along a plane perpendicular to the direction of the extrusion, and then machining the resulting portions of the extrusion.

In such embodiments, the first and second heat exchanger blocks 214 and 216 may have the same overall general cross-sectional profile. Furthermore, in such embodiments, the machining may include forming threads on the terminal end portions of the conduits described herein, cutting the transverse conduits through the blocks 214 and 216, and forming other features such as pockets in the heat exchanger blocks 214 and 216, as described herein. Such implementations may be relatively efficient and/or cost-effective (e.g., low cost) at least because they allow both heat exchanger blocks 214 and 216 to be made from a single extruder die, because they allow straightforward manufacture of the conduits 222 and 234 without relatively costly machining operations, and because they allow heat exchanger blocks of different lengths, such as to be provided in vaporizers of different overall capacities, to be fabricated from a single extruder die.

Such embodiments, including the first and second extruded aluminum heat exchanger blocks 214 and 216, are advantageous because they are scalable, in that the heat exchanger blocks 214 and 216 can be formed from a continuous extrusion and then cut to any desired size. Such embodiments are also advantageous because they are inspectable and cleanable without needing to disconnect the vaporizer 200 from external piping or plumbing coupled to the inlet 206 and/or to the outlet 208. For example, the linear conduits 222*a*, 222*b*, 222*c*, 234*a*, 234*b*, and 234*c* can be inspected and/or cleaned simply by removing one or more of the plugs 254 and/or 260 described herein, such as from a single end of the vaporizer 200, and then passing, such as pulling and/or pushing, a piece of material straight through their entire length. Such embodiments are also advantageous because they can be made explosion-proof, in accordance with the description of such features elsewhere herein, in that the extruded blocks are each made of a single piece of integral, monolithic, solid material, reducing or eliminating weak points therein associated with connections between different parts.

FIG. 15 illustrates a cross-sectional view of the first heat exchanger block 214 taken along line 15-15 in FIGS. 13 and 14. As illustrated in FIG. 15, the first heat exchanger block 214 has three linear, parallel conduits 222*a*, 222*b*, and 222*c* that each extend through the first heat exchanger block 214 along the length thereof. FIG. 15 also illustrates a flow path, indicated by arrows 298, along which liquefied gas flows as it is being vaporized and vaporized gas flows after it has been vaporized. As illustrated in FIG. 15, the flow path extends from the transverse conduit 232, along the length of the second linear conduit 222*b*, through a crossover into the first linear conduit 222*a*, and along the length of the first linear conduit 222*a* to the outlet 208 of the vaporizer 200. In some embodiments, the crossover between the first and second linear conduits 222*a*, 222*b* can be formed by machining after the body of the first heat exchanger block 214 is extruded. For example, the crossover may be formed by drilling a transverse conduit into a side of the first heat exchanger block 214, such as in a direction perpendicular to the lengths of the conduits 222, until it fluidically couples the first and second linear conduits 222*a*, 222*b*, and then back filling the opening machined into the side of the first heat exchanger block 214. In another example, the crossover may be formed by machining a first angled bore or passage into the terminal end of the first linear conduit 222*a* toward the second linear conduit 222*b*, and by machining a second angled bore or passage into the terminal end of the second linear conduit 222*b* toward the first linear conduit 222*a*, until the first and second angled passages reach one another to form an open passage between the first and second linear conduits 222*a*, 222*b*. FIG. 15 further illustrates that the third linear conduit 222*c* can be empty and unused.

FIG. 18 illustrates a cross-sectional view of the second heat exchanger block 216 taken along line 18-18 in FIGS. 16 and 17. As illustrated in FIG. 18, the second heat exchanger block 216 has three linear, parallel conduits 234*a*, 234*b*, and 234*c* that each extend through the second heat exchanger block 216 along the length thereof. FIG. 18 also illustrates a flow path, indicated by arrows 298, along which liquefied gas flows as it is being vaporized and vaporized gas flows after it has been vaporized. As illustrated in FIG. 18, the flow path extends from the inlet 206 and the transverse conduit 236, along the length of the third linear conduit 234*c*, through a crossover into the second linear conduit 234*b*, and along the length of the second linear conduit 234*b* to the transverse conduit 246. In some embodiments, the crossover between the second and third linear conduits 234*b*, 234*c* can be formed by machining after the body of the second heat exchanger block 216 is extruded. For example, the crossover may be formed by drilling a transverse conduit into a side of the second heat exchanger block 216, such as in a direction perpendicular to the lengths of the conduits 234, until it fluidically couples the second and third linear conduits 234*b*, 234*c*, and then back filling the opening machined into the side of the second heat exchanger block 216. In another example, the crossover may be formed by machining a first angled bore or passage into the terminal end of the second linear conduit 234*b* toward the third linear conduit 234*c*, and by machining a second angled bore or passage into the terminal end of the third linear conduit 234*c* toward the second linear conduit 234*b*, until the first and second angled passages reach one another to form an open passage between the second and third linear conduits 234*b*, 234*c*. FIG. 18 further illustrates that the first linear conduit 234*a* can extend from the transverse conduit 238 to an opposite end of the second heat exchanger block 216, such that the first linear conduit 234*a* can be used to carry electronic components, such as wires, along the length of the second heat exchanger block 216. While FIGS. 15 and 18 illustrate a flow path 298 of the vaporizer 200, in other embodiments, the gas flow path can be modified as needed to suit the demands of different applications.

As also illustrated in FIGS. 11 and 12, the vaporizer 200 includes an outlet fitting at the outlet 208 at an end of the first linear conduit 222*a*, which can be coupled to other conduits, pipes, etc. to carry vaporized gas away from the vaporizer 200. As also illustrated in FIGS. 11 and 12, the vaporizer 200 includes three caps or plugs 254 configured to cap or plug ends of the linear conduits 222*a* and 222*b*. For example, the vaporizer 200 includes a first plug 254 that covers and plugs an end of the first linear conduit 222*a* opposite to the outlet 208, as well as second and third plugs that cover and plug both ends of the second linear conduit 222*b*. The plugs 254 are liquid and gas tight so that liquefied gas and vaporized gas cannot escape or leak out of the plugged ends of the linear conduits 222*a* and 222*b*.

As also illustrated in FIGS. 11 and 12, the vaporizer 200 includes five caps or plugs 260 configured to cap or plug ends of the linear conduits 234*a*, 234*b*, and 234*c*. For example, the vaporizer 200 includes a first plug 260 that covers and plugs an end of the third linear conduit 234*c* opposite to the inlet 206, as well as second and third plugs that cover and plug both ends of the second linear conduit 234*b* and fourth and fifth plugs that cover and plug both ends of the first linear conduit 234*a*. The plugs 260 are liquid and gas tight so that liquefied gas and vaporized gas cannot escape or leak into or out of the plugged ends of the linear conduits 234.

The vaporizer 200 may also include a heater that can have any of the features and functionality of other heaters described herein, such as alignment or locating pins, such as of the heater and components thereof illustrated in FIGS. 7 and 8 and/or the heater 330 of the vaporizer 300 and components thereof described and illustrated elsewhere herein. FIG. 12 illustrates an electrical fitting at the electrical port 212. The electrical fitting carries three electrical wires into the vaporizer 200 and to the heater through the electrical port 212. In particular, the electrical fitting carries two wires to be coupled to bus plates of the heater, in the manner described with respect to FIGS. 7 and 8, and a ground wire to be coupled to the second heat exchanger block 216, when the vaporizer 200 is assembled. The three electrical wires or the two electrical wires to be coupled to the bus plates can be configured to be plugged into a standard socket or outlet, such as a standard American socket or outlet, and may be configured to carry power at 120, 240, or up to 277 volts from a standard source of single-phase power to the heater.

Figure 19:
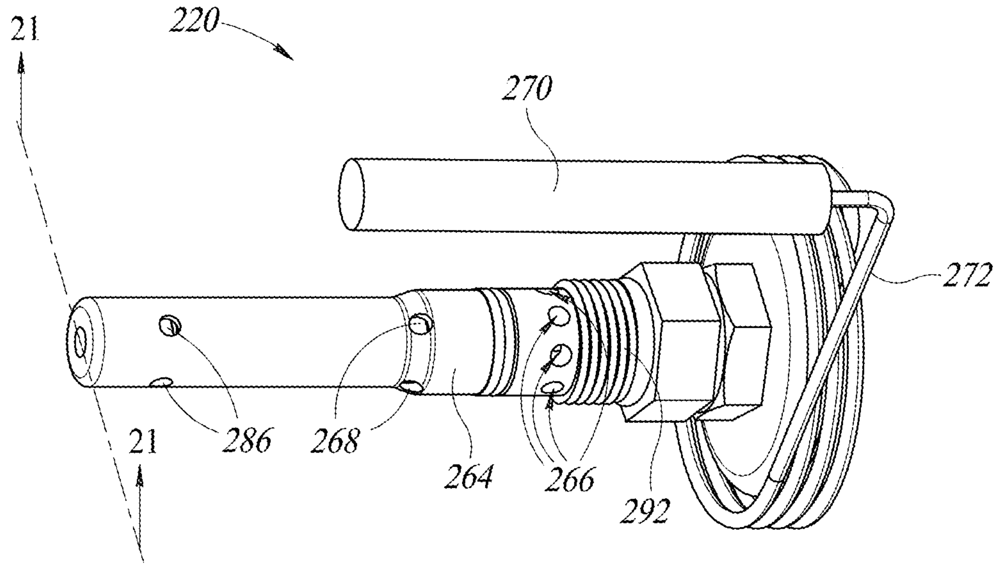
FIG. 19 illustrates an inlet capacity control valve of the vaporizer of FIG. 9.
Figure 20:
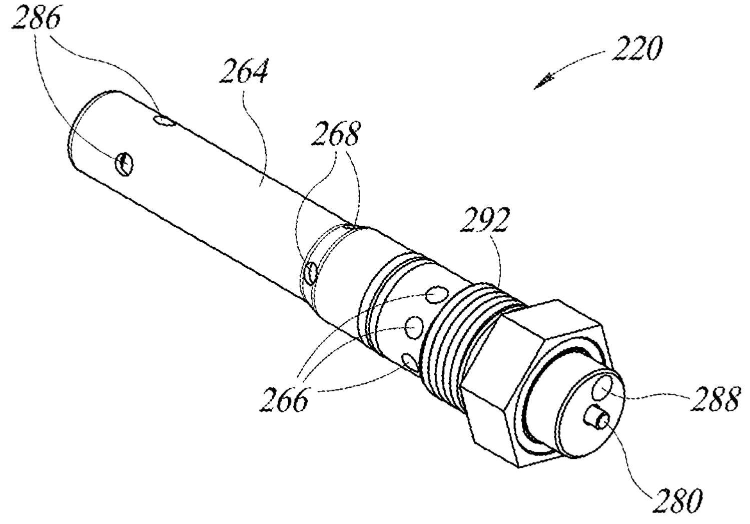
FIG. 20 illustrates the inlet capacity control valve of FIG. 19 with a temperature sensor thereof removed.
Figure 21:
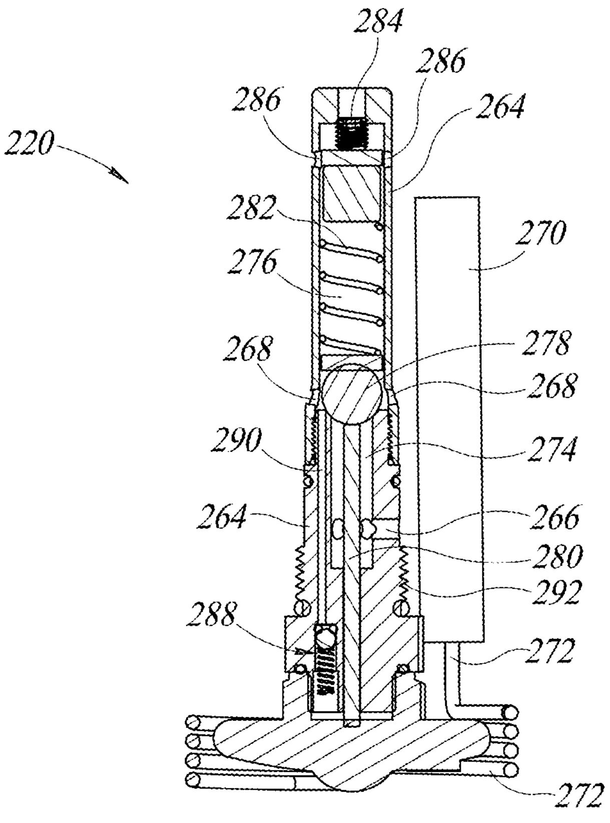
FIG. 21 illustrates a cross-sectional view of the inlet capacity control valve of FIG. 19 taken along line 21-21 in FIG. 19.

FIGS. 19-21 illustrate additional details of the inlet capacity control valve 220, which may be a spring-loaded ball valve. In particular, FIGS. 19-21 illustrate that the inlet capacity control valve 220 has features and functionality corresponding to those of the capacity control valve 30. For example, the capacity control valve 220 includes a valve body 264 that has the features and functionality of the valve body 40, a plurality of valve inlet apertures 266 spaced circumferentially around an outer surface of the valve body 264 that have the features and functionality of the valve inlet 34, and a plurality of valve outlet apertures 268 spaced circumferentially around the outer surface of the valve body 264 that have the features and functionality of the valve outlet 38. The capacity control valve 220 also includes a temperature sensor 270, which may include a thermocouple and which may have the features and functionality of the thermal sensing bulb 50, and which may carry its measurements of a temperature of a vaporized gas leaving the vaporizer 200 through the outlet 208 through a conduit or tube 272 that may have the features and functionality of the tube 52 to a thermal expansion chamber that may have the features and functionality of the thermal expansion chamber 42.

As further illustrated in FIGS. 19-21, the inlet capacity control valve 220 also includes a liquefied gas inlet chamber 274 that may have the features and functionality of the liquefied gas inlet chamber 44 and a liquefied gas outlet chamber 276 that may have the features and functionality of the liquefied gas outlet chamber 46. As in the capacity control valve 30, the liquefied gas inlet chamber 274 may be separated from the thermal expansion chamber by a membrane or a diaphragm that may have the features and functionality of the diaphragm 48. The liquefied gas inlet chamber 274 may also be separated from the liquefied gas outlet chamber 276 by a ball 278, which may have the features and functionality of the valve 62, and which may engage with the valve body 264 in the manner the valve 62 engages with the valve seat 60. The inlet capacity control valve 220 may further include a rigid valve stem 280, a biasing spring 282, and an adjustment screw 284, which may have the same features and functionality as the rigid valve stem 64, biasing spring 66, and adjustment screw 68, respectively.

As further illustrated in FIGS. 19-21, the inlet capacity control valve 220 includes a plurality of valve drain apertures 286 spaced circumferentially around an outer surface of the valve body 264 proximate an end portion thereof adjacent to the adjustment screw 284 and opposite the liquefied gas inlet chamber 274 across the liquefied gas outlet chamber 276. When the vaporizer 200 is in use and liquefied gas to be vaporized is fed into the inlet capacity control valve 220, the liquefied gas typically includes impurities or contaminants that have a higher boiling point than the rest of the liquefied gas, and therefore remain in liquid form as the rest of the liquefied gas is vaporized. It has been found that such liquids have a tendency to accumulate at the terminal end portion of the inlet capacity control valve 220. The valve drain apertures 286 may therefore allow such liquids to escape the terminal end portion of the inlet capacity control valve 220 rather than undesirably accumulating therein.

As also illustrated in FIGS. 19-21, the inlet capacity control valve 220 includes an integral relief bypass valve 288 integrated within its valve body 264. The bypass valve 288 includes a longitudinal conduit 290 that extends longitudinally along the length of the valve body 264 from a first opening thereof in fluid communication with the liquefied gas outlet chamber 276 to a second opening thereof in fluid communication with the liquefied gas inlet chamber 274. At the second opening in fluid communication with the liquefied gas inlet chamber 274, and also within the valve body 264, the integral relief bypass valve 288 includes a spring-loaded ball valve. The spring of the spring-loaded ball valve of the bypass valve 288 can be configured to compress, thereby opening the bypass valve, when the pressure within the liquefied gas outlet chamber 276 exceeds the pressure within the liquefied gas inlet chamber 274 by at least a threshold pressure differential. The integral bypass valve 288 can be particularly useful in the event the temperature sensor 270 or other associated components fail, such as by allowing liquid flow back to the storage tank under such conditions. The integral relief bypass valve 288 can reduce or eliminate the need for a costly external bypass valve and plumbing associated therewith.

As illustrated in FIGS. 19-21, the inlet capacity control valve 220 includes a set of threads 292 formed on an outer surface thereof, at a location surrounding the rigid valve stem 280 and the liquefied gas inlet chamber 274, and at a location between the thermal expansion chamber and the diaphragm and the valve inlet apertures 266, ball 278, and liquefied gas outlet chamber 276. As illustrated in FIG. 11, such threads 292 can be threaded into corresponding threads formed on an inner surface of the second heat exchanger block 216, such as at a terminal end portion of the third linear conduit 234*c* thereof. Thus, the inlet capacity control valve 220, or at least a portion thereof, may be threaded into and located inside the third linear conduit 234*c* and threaded into and inside the second heat exchanger block 216. Thus, the vaporizer 200 does not need to include, and does not include, a conduit corresponding to liquefied gas inlet tube 39. Rather, an outlet of the capacity control valve 220 is located inside the linear conduit 234*c* and the second heat exchanger block 216 such that liquefied gas flows directly out of the valve 220 into the conduit 234*c* without an intermediate tube. Thus, a flow path of the liquefied gas can start at a tank or a source of the liquefied gas, enter the vaporizer 200 through the inlet 206, pass through the transverse conduit 236, through a portion of the linear conduit 234*c* to the inlet apertures 266, and through the capacity control valve 220 to the linear conduit 234*c*, where it follows the flow path 298 described elsewhere herein to the outlet 208.

As illustrated in FIG. 18, the diameter of the third linear conduit 234*c* in the region of the transverse conduit 236 is larger than the diameter of the rest of the third linear conduit 234*c*. This allows a distal portion of the valve body 264 to fit snugly within the portion of the conduit 234*c* having a smaller diameter while leaving an open annular space between a proximal portion of the valve body 264 including the valve inlet apertures 266 and the surrounding surface of the conduit 234*c*, such that liquefied gas can flow into the conduit 234*c* through the inlet 206 and the transverse conduit 236, then around the valve body 264 through the open annular space, and then into the inlet capacity control valve 220 through the inlet apertures 266.

While the vaporizer 200 includes the inlet capacity control valve 220 illustrated in FIGS. 19-21, in alternative embodiments, the vaporizer 200 may not include the inlet capacity control valve 220 and may include any other type of valve suitable for controlling the flow rate of liquefied gas into the vaporizer 200. For example, in one alternative embodiment, the vaporizer 200 may not include the inlet capacity control valve 220 and may instead include a capacity control valve with components external to the heat exchanger blocks and located downstream of the heat exchanger blocks. In such cases, the external and downstream components can be configured to detect the presence of liquid, and upon detection of a liquid, close an inlet valve to the heat exchanger to prevent flooding therein. In some cases, such a valve may need to be manually reset once closed.

Figure 22:
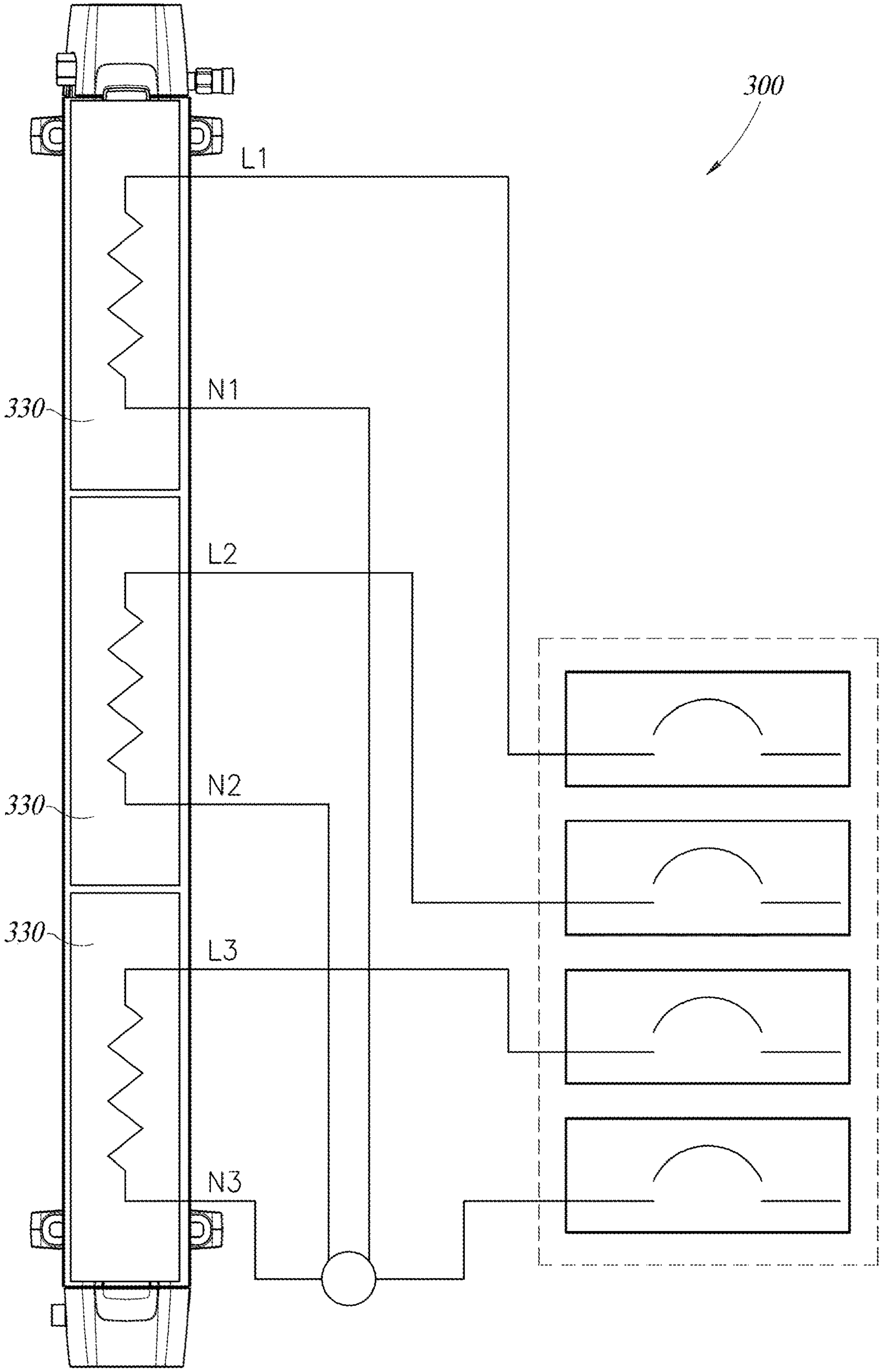
FIG. 22 illustrates portions of another vaporizer with a housing and a first heat exchanger block thereof removed.

FIG. 22 illustrates portions of another vaporizer 300. The vaporizer 300 and its components may include any of the features and functionality described elsewhere herein for other vaporizers and their components, including the vaporizer 200 and its components. Any of the components described with respect to vaporizer 200 may be incorporated into and used with the vaporizer 300. FIG. 22 illustrates that the vaporizer 300 includes three heaters 330 having the same features and functionality as other heaters described herein, such as alignment or locating pins, such as of the heater and components thereof illustrated in FIGS. 7 and 8 and/or the heater of the vaporizer 200 and components thereof described and illustrated elsewhere herein.

The vaporizer 300 may include an electrical fitting, corresponding to the electrical fitting of the vaporizer 200, that carries seven electrical wires into the vaporizer 300 and to the heaters 330 through an electrical port corresponding to the electrical port 212. In particular, the electrical fitting may carry two wires (e.g., a phase wire L1, L2, or L3, and a neutral wire N1, N2, or N3) to be coupled to the bus plates of each of the three heaters 330, in the manner described with respect to FIGS. 7 and 8 as well as with respect to the vaporizer 200, and a ground wire to be coupled to a heat exchanger block of the vaporizer 300 when the vaporizer 300 is assembled.

The seven electrical wires or the six electrical wires to be coupled to the bus plates can be configured to be plugged into a standard source of three-phase power, such as a source of industrial-scale power, and may be configured to carry power at up to 480 volts from a standard source of industrial, three-phase power to the heaters 330. In such embodiments, the electrical wires may be configured to carry power to each of the three heaters 330 individually, such that the heaters 330 are powered individually and can be controlled individually, and such that a failure of wiring supplying power to one of the heaters 330 does not cause a complete failure of the vaporizer 300 because the remaining heaters 330 still receive power independently.

In some implementations, the heaters 330 can have the same heating capacity as one another, and can each have the same heating capacity as the heater of the vaporizer 200.

Thus, because the vaporizer 200 has one heater and the vaporizer 300 has three heaters 330, the vaporizer 300 can be about three times as long, and have three times the capacity to vaporize a liquefied gas, as the vaporizer 200. In other embodiments, the vaporizer 300 may be configured to be any number of times as long as the vaporizer 200, such as about 1.5, 2.0, 2.5, 3.0, 3.5, 4.0, 4.5, or 5.0 times as long as the vaporizer 200, to have heat exchanger blocks that are any number of times as long as the first and second heat exchanger blocks 214 and 216, such as about 1.5, 2.0, 2.5, 3.0, 3.5, 4.0, 4.5, or 5.0 times as long as the first and second heat exchanger blocks 214 and 216, to have any number of times the capacity to vaporize a liquefied gas as the vaporizer 200, such as at least 1.5, 2.0, 2.5, 3.0, 3.5, 4.0, 4.5, or 5.0 times the capacity to vaporize a liquefied gas as the vaporizer 200, and/or to have any number of times as many heaters as the vaporizer 200, such as at least 2, 3, 4, or 5 times as many heaters as the vaporizer 200.

In some embodiments, each of the first and second heat exchanger blocks 214 and 216 and corresponding heat exchanger blocks of the vaporizer 300 may comprise a single piece of aluminum, and may be fabricated by extruding aluminum through a single extruder die and then machining the resulting single-piece extrusions. Further, in some embodiments, the first heat exchanger block 214 may be fabricated by extruding aluminum through an extruder die and then machining the resulting single-piece extrusion, the second heat exchanger block 216 may be fabricated by extruding aluminum through the same extruder die and then machining the resulting single-piece extrusion, a first heat exchanger block of the vaporizer 300 may be fabricated by extruding aluminum through the same extruder die and then machining the resulting single-piece extrusion, and a second heat exchanger block of the vaporizer 300 may be fabricated by extruding aluminum through the same extruder die and then machining the resulting single-piece extrusion. In some further embodiments, the first and second heat exchanger blocks 214 and 216 and the first and second heat exchanger blocks of the vaporizer 300 may be fabricated by extruding aluminum through an extruder die to form a single-piece aluminum extrusion, then cutting the single-piece aluminum extrusion in along planes perpendicular to the direction of the extrusion, and then machining the resulting portions of the extrusion.

FIGS. 23-26 illustrate additional embodiments of heat exchanger blocks for use in vaporizers as described herein. Any of the components of the heat exchanger blocks described with respect to FIGS. 23-26 may be fabricated, such as from aluminum, by 3D printing, continuous extrusion, and/or machining as described elsewhere herein. For example, FIGS. 23A and 23B illustrate end views of a one-piece or a single-piece heat exchanger block 400 that can be used in place of any of the pairs of heat exchanger blocks described herein, including the first and second heat exchanger blocks 214 and 216 or the first and second heat exchanger blocks of the vaporizer 300. In particular, FIG. 23A illustrates the heat exchanger block 400 in a strained, open configuration, and FIG. 23B illustrates the heat exchanger block 400 in a relaxed, closed configuration. The single-piece heat exchanger block 400 includes linear conduits 402 that extend along the length of the heat exchanger block 400 from a first end thereof to a second end thereof, that can correspond to and have the features and functionality of the conduits 222*a*, 222*b*, 234*b*, and 234*c*, and that can carry liquefied gas as it is being vaporized therethrough. As illustrated in FIGS. 23A and 23B, the heat exchanger block 400 also includes a cavity 404 that extends through the middle of the heat exchanger block 400 and along its length, which can be configured to receive heaters as described herein for heating the liquefied gas flowing through the conduits 402.

Figure 23A:
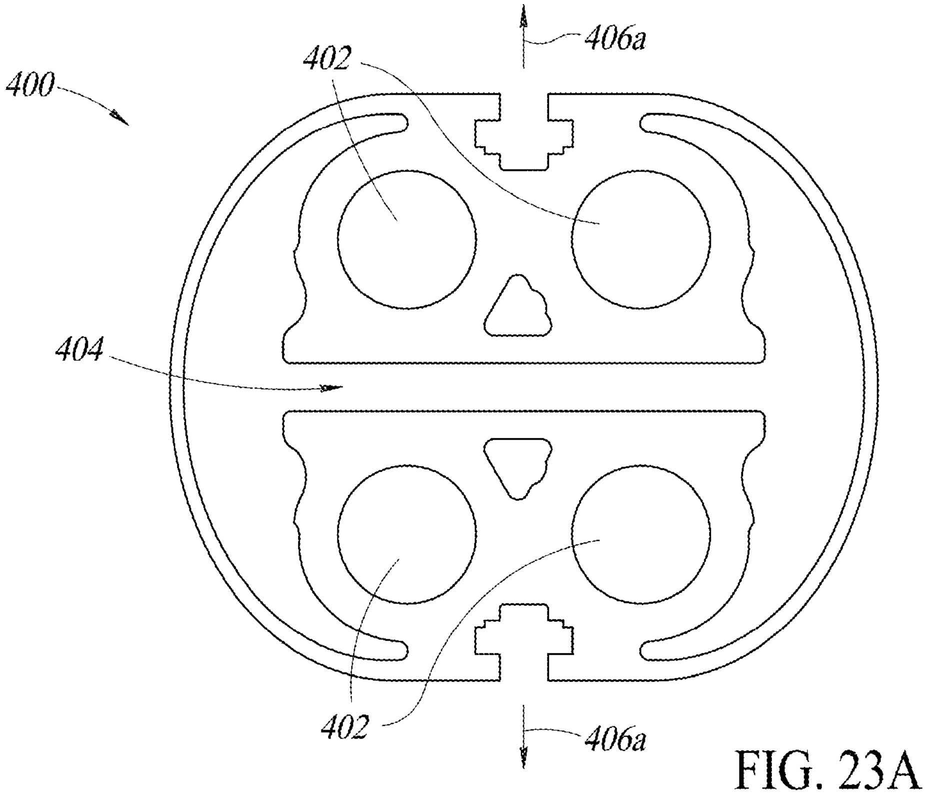
FIG. 23A illustrates an end view of a one-piece aluminum heat exchanger block for use in a vaporizer in an open configuration.
Figure 23B:
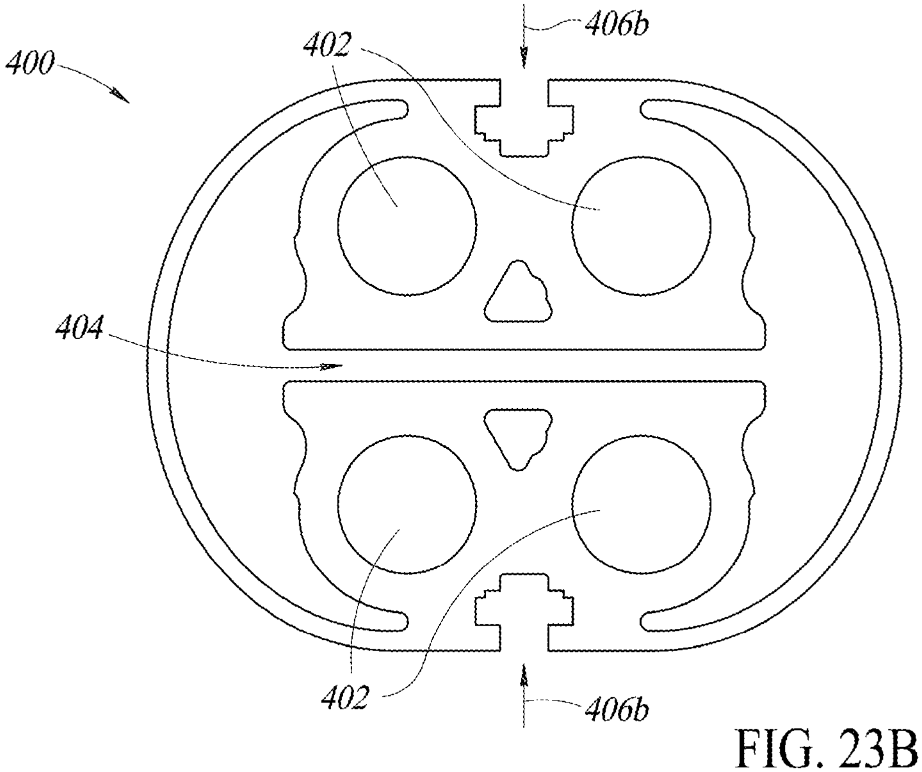
FIG. 23B illustrates an end view of the one-piece aluminum heat exchanger block for use in a vaporizer of FIG. 23A in a relaxed, closed configuration.

In some embodiments, a vaporizer can be assembled by straining the heat exchanger block 400 into the open configuration illustrated in FIG. 23A by pulling opposite sides of the heat exchanger blocks outward from one another in a direction indicated by arrows 406*a* in FIG. 23A, then installing one or more heaters as described herein within the cavity 404 at the center of the heat exchanger block 400, and then releasing the heat exchanger block 400 to allow it to relax and compress in the direction indicated by arrows 406*b* in FIG. 23B to squeeze and capture the heaters permanently within the cavity and retain the heaters within the heat exchanger block 400. In some embodiments, such a vaporizer can be provided with caps or plugs at the ends of the conduits 402, as described with respect to the vaporizers 200 and 300, or the ends of the conduits can be sealed with an epoxy compound to ensure the resulting vaporizer is explosion-proof and suitable for use in hazardous locations in accordance with the description of such features elsewhere herein.

Figure 24:
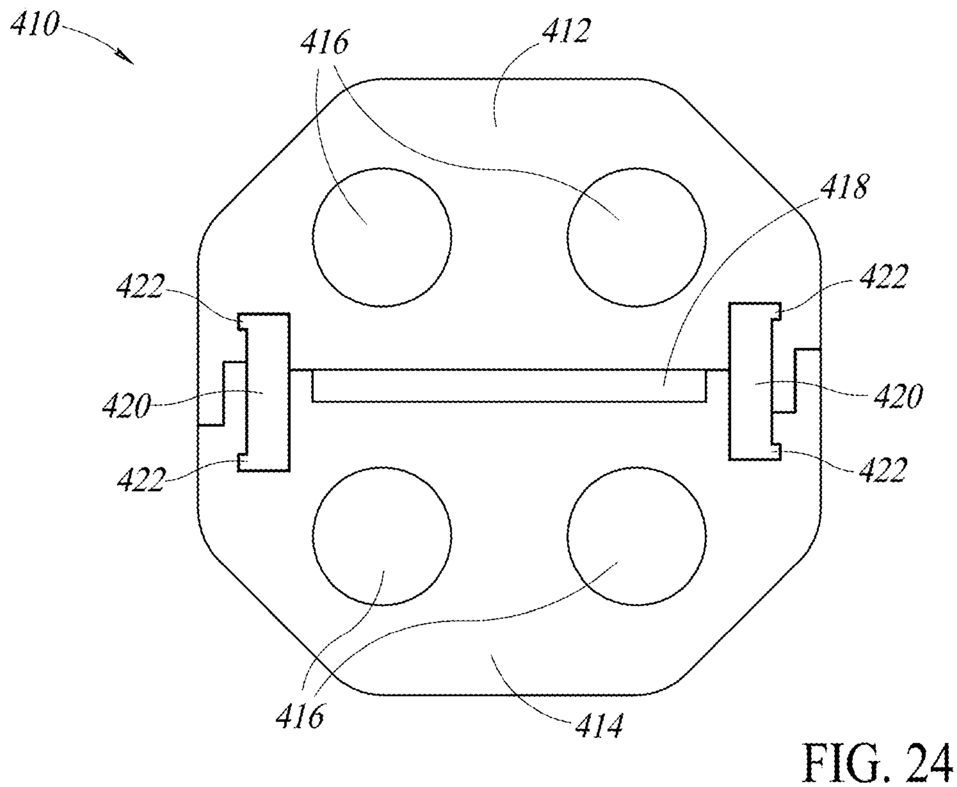
FIG. 24 illustrates an end view of a two-piece aluminum heat exchanger block for use in a vaporizer.

FIG. 24 illustrates an end view of a two-piece heat exchanger block 410 that can be used in place of any of the pairs of heat exchanger blocks described herein, including the first and second heat exchanger blocks 214 and 216 or the first and second heat exchanger blocks of the vaporizer 300. The two-piece heat exchanger block 410 includes a first heat exchanger block 412 and a second heat exchanger block 414. The first and second heat exchanger blocks 412 and 414 include respective linear conduits 416 that extend along the length of the first and second heat exchanger blocks 412, 414 from first ends thereof to second ends thereof, that can correspond to and have the features and functionality of the conduits 222*a*, 222*b*, 234*b*, and 234*c*, and that can carry liquefied gas as it is being vaporized therethrough.

As illustrated in FIG. 24, when the first and second heat exchanger blocks 412 and 414 are assembled together, three additional conduits or cavities are formed between them, including a central cavity 418 and two peripheral cavities. The central cavity extends through the middle of the assembled first and second heat exchanger blocks 412, 414 and along their lengths, which can be configured to receive heaters as described herein for heating the liquefied gas flowing through the conduits 416. The two peripheral cavities extend along the lengths of the first and second heat exchanger blocks 412 and 414 and are configured to receive internal locking rods 420 that serve to lock the first and second heat exchanger blocks 412, 414 together. As one example, each of the peripheral cavities can have a rectangular shape with additional grooves extending out of the long edges of the rectangular shapes and the locking rods 420 can have corresponding rectangular shapes with additional ridges 422 extending out of the long edges of the rectangular shapes.

In some embodiments, a vaporizer can be assembled by positioning the first and second heat exchanger blocks 412, 414 adjacent one another as shown in FIG. 24, installing one or more heaters as described herein within the cavity 418, and then longitudinally pressing the internal locking rods 420 into, through, and along the peripheral cavities to lock the first and second heat exchanger blocks to one another. Engagement of the ridges 422 of the internal locking rods with the grooves of the peripheral cavities can prevent the first and second heat exchanger blocks 412, 414 from moving apart or separating from one another.

Figure 25:
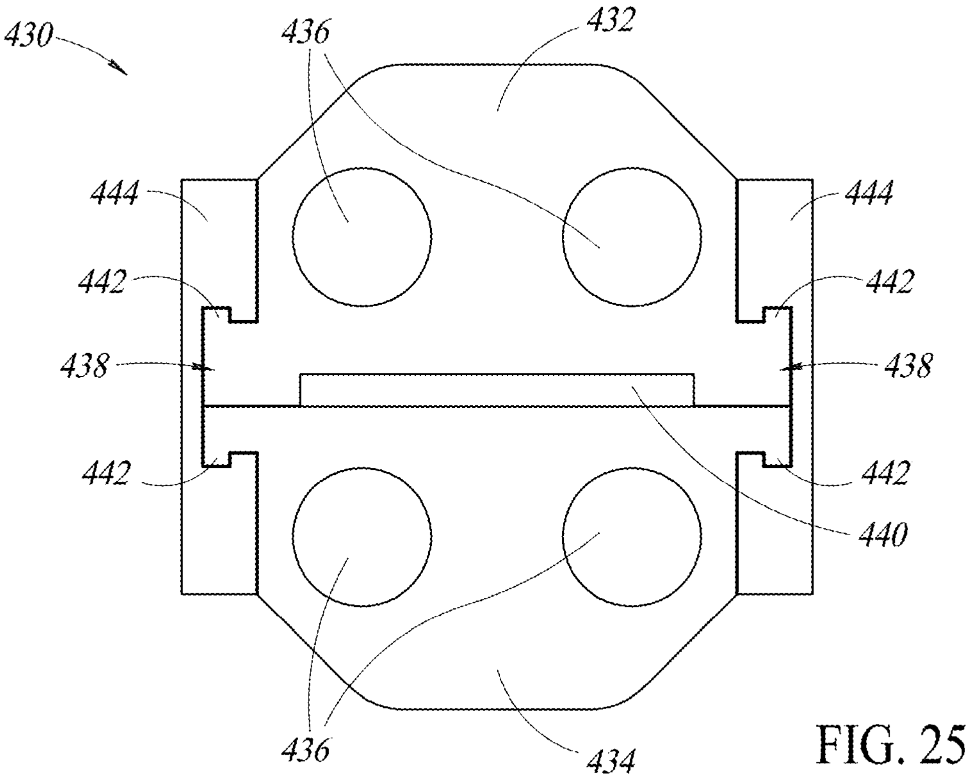
FIG. 25 illustrates an end view of a two-piece aluminum heat exchanger block for use in a vaporizer.

FIG. 25 illustrates an end view of a two-piece heat exchanger block 430 that can be used in place of any of the pairs of heat exchanger blocks described herein, including the first and second heat exchanger blocks 214 and 216 or the first and second heat exchanger blocks of the vaporizer 300. The two-piece heat exchanger block 430 includes a first heat exchanger block 432 and a second heat exchanger block 434. The first and second heat exchanger blocks 432 and 434 include respective linear conduits 436 that extend along the length of the first and second heat exchanger blocks 432, 434 from first ends thereof to second ends thereof, that can correspond to and have the features and functionality of the conduits 222*a*, 222*b*, 234*b*, and 234*c*, and that can carry liquefied gas as it is being vaporized therethrough.

As illustrated in FIG. 25, when the first and second heat exchanger blocks 432 and 434 are assembled together, a central conduit or cavity 440 is formed between them. The central cavity 440 extends through the middle of the assembled first and second heat exchanger blocks 432, 434 and along their lengths, and can be configured to receive heaters as described herein for heating the liquefied gas flowing through the conduits 436. Each of the first and second heat exchanger blocks 432 and 434 also includes a pair of protrusions that engage with one another when the first and second heat exchanger blocks 432 and 434 are assembled to form combined protrusions 438 extending outward from a main body of the assembly. Each of the combined protrusions 438 extends outward from a side surface of the main body of the assembly that is nearest to a peripheral edge of the central cavity 440, and that is located at a seam between the first and second heat exchanger blocks 432 and 434. Each of the protrusions of each of the first and second heat exchanger blocks 432 and 434 also includes a ridge 442 that extends outward from the rest of the respective protrusion in a direction away from the opposing heat exchanger block.

In some embodiments, a vaporizer can be assembled by positioning the first and second heat exchanger blocks 432, 434 adjacent one another as shown in FIG. 25, installing one or more heaters as described herein within the cavity 440, and then longitudinally pressing external locking rods 444 over the protrusions 438 and the ridges 442 and along the length of the heat exchanger blocks 432, 434, to lock the first and second heat exchanger blocks 432, 434 to one another. For example, each of the external locking rods 444 can have a channel formed therein and configured to receive one of the protrusions and undercut grooves at each end of the channel configured to receive one of the ridges 442. Engagement of the protrusions 438 with the channels can prevent the heat exchanger blocks 432 and 434 from moving apart or separating from one another, and engagement of the ridges 442 with the undercut grooves can prevent the external locking rods 444 from moving apart or separating from the first and second heat exchanger blocks 432, 434.

Figure 26:
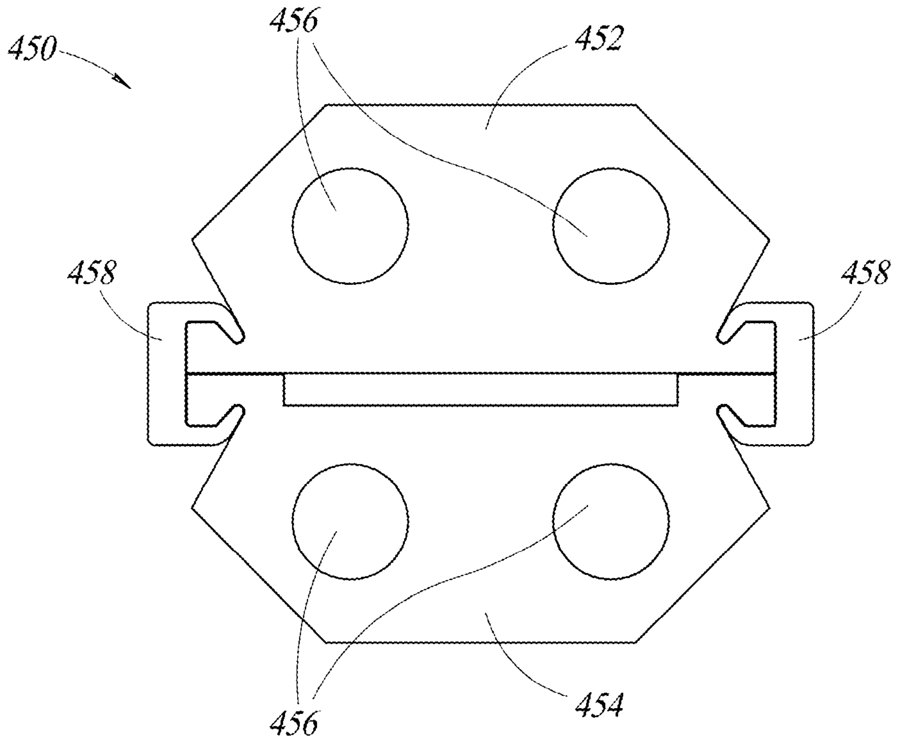
FIG. 26 illustrates an end view of a two-piece aluminum heat exchanger block for use in a vaporizer.

FIG. 26 illustrates an end view of a two-piece heat exchanger block 450 that can be used in place of any of the pairs of heat exchanger blocks described herein, including the first and second heat exchanger blocks 214 and 216 or the first and second heat exchanger blocks of the vaporizer 300. The two-piece heat exchanger block 450 includes a first heat exchanger block 452 and a second heat exchanger block 454. The first and second heat exchanger blocks 452 and 454 include respective linear conduits 456 that extend along the length of the first and second heat exchanger blocks 452, 454 from first ends thereof to second ends thereof, that can correspond to and have the features and functionality of the conduits 222*a*, 222*b*, 234*b*, and 234*c*, and that can carry liquefied gas as it is being vaporized therethrough. The heat exchanger block 450 has the same features and functionality as the heat exchanger block 430 and may further include external retaining clips 458, which may deform when installed on the first and second heat exchanger blocks 452 and 454 to clamp the two heat exchanger blocks 452, 454 to one another.

The systems described herein may be used as liquefied gas vaporizers, water heaters for domestic hot water, industrial applications such as preheating of fluids and gasses, and fluid heaters for hospital and other health care requirements, etc. The systems described herein may be especially useful in healthcare applications, where fluid heating devices are closely regulated to prevent burns to patients in the event of malfunctions. Again, due to the self-regulating nature of the PTC elements employed, this is an extremely safe and economical device for such an application. Another application of the systems described herein may be in vehicles powered by engines that burn hydrocarbon gases. Such vehicles generally carry tanks of liquefied gas, which must be vaporized prior to use.

U.S. Pat. Nos. 6,816,669, 6,957,013, and 6,707,987 are hereby incorporated herein by reference in their entireties. Features and aspects of the embodiments described herein can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method, comprising:

fabricating a heater assembly for heating a liquefied gas, the heater assembly comprising:

a heat exchanger block having a first end, a second end, and at least two parallel linear conduit passages that are offset from each other and extend from the first end to the second end; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration;

wherein fabricating the heater assembly includes extruding the heat exchanger block as a single piece of aluminum, whereby the at least two parallel linear conduit passages are integrally formed in the heat exchanger block during the extruding, and thereafter removing material of the heat exchanger block between the at least two parallel linear conduit passages to connect the at least two parallel linear conduit passages together.

2. The method of claim 1 wherein:

the heat exchanger block is a first heat exchanger block and the heater further comprises a second heat exchanger block having a first end, a second end, and a conduit that extends from the first end to the second end;

the positive temperature coefficient heater is located between the first heat exchanger block and the second heat exchanger block; and fabricating the heater assembly includes extruding the second heat exchanger block as a single piece of aluminum.

3. The method of claim 2 wherein fabricating the heater assembly includes extruding the first heat exchanger block through an extruder die and extruding the second heat exchanger block through the extruder die.

4. The method of claim 2 wherein fabricating the heater assembly includes extruding a single extrusion of aluminum in an extrusion direction and cutting the single extrusion of aluminum along a plane perpendicular to the extrusion direction to separate the first heat exchanger block from the second heat exchanger block.

5. The method of claim 1, wherein the heater assembly is a first heater assembly and the method further comprises:

fabricating a second heater assembly, the second heater assembly having a greater capacity to heat the liquefied gas than the first heater assembly, the second heater assembly comprising:

a heat exchanger block having a first end, a second end, and a conduit that extends from the first end to the second end; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration;

wherein fabricating the second heater assembly includes extruding the heat exchanger block as a single piece of aluminum;

wherein extruding the heat exchanger block of the first heater assembly and extruding the heat exchanger block of the second heater assembly includes extruding the heat exchanger blocks of the first and second heaters through a same extruder die.

6. The method of claim 5 wherein the second heater assembly has two times the capacity to heat liquefied gas than the first heater assembly.

7. The method of claim 5 wherein the second heater assembly has three times the capacity to heat liquefied gas than the first heater assembly.

8. The method of claim 5 wherein the heat exchanger block of the second heater assembly is about twice as long as the heat exchanger block of the first heater assembly.

9. The method of claim 5 wherein the heat exchanger block of the second heater assembly is about three as long as the heat exchanger block of the first heater assembly.

10. The method of claim 5 wherein the first heater assembly has at least twice as many positive temperature coefficient heaters as the second heater assembly.

11. The method of claim 5 wherein the first heater assembly has at least three times as many positive temperature coefficient heaters as the second heater assembly.

12. The method of claim 1 wherein extruding the heat exchanger block as a single piece of aluminum includes extruding the heat exchanger block to have first and second undercut grooves in an outer surface thereof.

13. The method of claim 12 wherein the heater assembly is a first heater assembly and the method further comprises:

fabricating a second heater assembly, the second heater assembly comprising:

a heat exchanger block having a first end, a second end, and a conduit that extends from the first end to the second end; and a positive temperature coefficient heater configured to heat the heat exchanger block, wherein the positive temperature coefficient heater includes first and second conductive plates and a plurality of positive temperature coefficient heating stones in electrical contact with the conductive plates in an electrically parallel configuration;

wherein fabricating the second heater assembly includes extruding the heat exchanger block of the second heater assembly as a single piece of aluminum and to have first and second undercut grooves in an outer surface thereof.

14. The method of claim 13, further comprising coupling the heat exchanger block of the first heater assembly to the heat exchanger block of the second heater assembly via the first and second undercut grooves of the heat exchanger block of the first heater assembly and the first and second undercut grooves of the heat exchanger block of the second heater assembly.

15. The method of claim 1 wherein the heater assembly is a vaporizer.

* * * * *